(12) United States Patent
Hirata et al.

(10) Patent No.: US 6,299,313 B1
(45) Date of Patent: Oct. 9, 2001

(54) PROJECTION DISPLAY APPARATUS AND PROJECTION LENS DEVICE FOR USE THEREIN

(75) Inventors: Koji Hirata, Yokohama; Shigeru Mori, Chigasaki; Naoyuki Ogura, Machida; Yasuo Otsuka, Chigasaki, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/626,787

(22) Filed: Jul. 26, 2000

Related U.S. Application Data

(62) Division of application No. 09/146,347, filed on Sep. 3, 1998, now Pat. No. 6,124,979.

(30) Foreign Application Priority Data

Sep. 10, 1997 (JP) .................................................. 9-245114

(51) Int. Cl.[7] .......................... G03B 21/18; G02F 1/1335
(52) U.S. Cl. .................................. 353/54; 349/5; 349/96; 349/138; 349/122; 349/161; 348/749; 348/766; 348/751
(58) Field of Search .................................. 359/648–651; 353/51; 349/5, 96, 138, 122, 161; 348/749, 766, 751

(56) References Cited

U.S. PATENT DOCUMENTS

| | | | |
|---|---|---|---|
| 4,704,009 | 11/1987 | Yamamoto et al. | 359/649 |
| 4,872,748 | 10/1989 | Braat | 359/651 |
| 4,963,007 | 10/1990 | Moskovich | 359/649 |
| 5,026,149 * | 6/1991 | Braat | 359/649 |
| 5,168,351 | 12/1992 | Bradley et al. | 348/780 |
| 5,227,821 * | 7/1993 | Vogeley et al. | 353/122 |
| 5,255,029 * | 10/1993 | Vogeley et al. | 353/122 |
| 5,272,540 | 12/1993 | Hirata et al. | 348/781 |
| 5,367,405 | 11/1994 | Sado | 359/649 |
| 5,371,628 | 12/1994 | Shimoda et al. | 359/649 |
| 5,404,246 | 4/1995 | Kaneko et al. | 359/649 |
| 5,552,906 | 9/1996 | Yamagishi et al. | 349/5 |
| 5,570,215 * | 10/1996 | Omae et al. | 359/649 |
| 5,572,364 | 11/1996 | Toide et al. | 359/649 |
| 5,587,838 | 12/1996 | Kasihara | 359/649 |
| 5,642,229 | 6/1997 | Kaneko et al. | 359/649 |
| 5,709,463 * | 1/1998 | Igram | 362/268 |
| 5,731,917 | 3/1998 | Inoue | 359/649 |
| 5,767,924 * | 6/1998 | Hiroki et al. | 349/5 |
| 5,973,848 | 10/1999 | Taguchi et al. | 359/651 |
| 6,028,649 * | 2/2000 | Faris et al. | 349/10 |
| 6,094,245 * | 7/2000 | Ochi et al. | 349/96 |

FOREIGN PATENT DOCUMENTS 2-262615-A  * 10/1990 (JP) .
04-100002 A * 4/1992 (JP) .
11-119202-A * 4/1999 (JP) .

* cited by examiner

Primary Examiner—Evelyn A Lester
(74) Attorney, Agent, or Firm—Antonelli, Terry, Stout & Kraus, LLP

(57) ABSTRACT

A projection display apparatus including an optical modulator for modulating an incident light from a light source, and a projection lens device for projecting the light modulated by the optical modulator. The optical modulator includes a liquid crystal panel, a cooling liquid filled up at least within a space defined between the liquid crystal panel and a lens of the projection lens device which is located closest to a light source side, and a polarizing plate. The polarizing plate is positioned in the space so that opposite surfaces of the polarizing plate contact the cooling liquid.

11 Claims, 30 Drawing Sheets

PROJECTION DISPLAY APPARATUS AND PROJECTION LENS DEVICE FOR USE THEREIN

CROSS REFERENCE TO RELATED APPLICATION

This is a divisional of U.S. application Ser. No. 09/146,347, filed Sep. 3, 1998, now U.S. Pat. No. 6,124,979, issued Sep. 26, 2000, the subject matter of which is incorporated by reference herein.

BACKGROUND OF THE INVENTION

1. Field of the Invention

The present invention relates to a projection display apparatus such as a projection television apparatus and a projection lens device suitable for use therein, and in particular, relates to those in which an original image displayed upon a liquid crystal panel is expansively projected so that the apparatus as a whole can be made in compactness, with a little distortion in picture, as well as being suitable for improvement of brightness, focus and contrast thereof.

2. Description of Related Art

Accompany with diversity of image sources, projection display apparatuses have been widely spread on market because of the commercial values in light weight, low price and compactness thereof. Among of those, following with a remarkable improvement in definition and vignetting factor in a liquid crystal panel, a set of a projection type image display device, in which the liquid crystal panel is used as an original image source to be projected, begins to be brought on market in recent years. This projection type image display apparatus is so constructed that the original image displayed on the liquid crystal panel is enlarged by a projection lens on a screen with full colors.

As an optical system for the projection type image display apparatus, there are already known two types, in one of which, as is disclosed in FIG. 19 of Japanese Patent Laying-Open No. Hei 9-96759 (1997), three (3) pieces of the liquid crystal panels are used (three-plate type), and in the other of which, as is disclosed in FIG. 1 of Japanese Patent Laying-Open No. Hei 4-60538 (1992), a single (1) piece of the liquid crystal panel is used (singular-plate type). However, in those days, in view of being small in the number of parts and of cost reduction thereof, the optical system of the singular-plate type has been extensively developed.

Construction in the optical system of this singular plate type (using a single piece of the liquid crystal panel) will be explained by referring to FIGS. 22 and 23. As is shown in FIG. 22, a light beam emitting from a white light source 28 of a metal halide lamp (other than that, a xenon lamp or a halogen lamp can be used) is reflected by a reflection mirror 29 so as to be effectively irradiated upon a condenser lens 27, then obtaining a white light beam being almost in parallel by a collimator lens 26.

In a front of the collimator lens 26 are positioned three kinds of dichroic mirrors 23, 24 and 25. Each of those dichroic mirrors 23, 24 and 25 has a characteristic of selectively reflecting a light of wavelength of green, red or blue, respectively, while penetrating others therethrough. R, G and B indicate the lights of red color, green color and blue color, which are separated by those dichroic mirrors 23, 24 and 25, respectively. In this conventional art, it is so constructed that the blue color light beam and the green color light beam enter into the liquid crystal panel 22 diagonally as a standard of the red color light beam.

On the liquid crystal panel 22, there are provided pixels corresponding to the three primary colors, i.e., red, green and blue, and each pixel is so set that it can obtain a light transmittance corresponding to the level of luminance signal in a picture signal, respectively. Therefore, the lights of the red, green and blue are modulated meeting with the picture signal level so as to obtain a desired picture on the liquid crystal. This picture which is displayed on the liquid crystal 22 is enlarged and projected on the screen 20 by the projection lens device 21.

In order to take the picture light emitted from the liquid crystal 22 into the projection lens device 21 effectively, there was proposed an optical system in which a convex lens showing condensing function is provided between the liquid crystal panel 22 and the projection lens device 21 (not shown in FIGS. 22 and 23).

The white light source 28 generates heat by itself and the liquid crystal panel (including a polarization plate thereof) is heated due to absorption of the incident light thereon, therefore they come to be reasons of causing damages thereon, respectively. Then, for reducing the increase of the temperature of them, a cooling fan (not shown in the figure) is provided to compulsively cool them, so that they can be used within a predetermined range of the temperature.

FIG. 23 shows an another example of the optical system of the conventional singular-plate type (using a single liquid crystal panel). In this, the same reference numerals are attached to the same elements in the optical system shown in FIG. 22. A light beam emitting from the white light source 28 of the metal halide lamp (other than that, the xenon lamp or the halogen lamp can be used) is reflected by the reflection mirror 29 so as to be effectively irradiated upon the condenser lens 27, then obtaining the white light beam being almost in parallel by the collimator lens 32. Then, by means of a polarization beam splitter 31 (hereinafter, it is abbreviated with "PBS"), a S-polarization light and a P-polarization light are combined to each other. Thereafter, the white light which is converged by the condenser lens 30 is converted into a light which is almost in parallel through the collimator lens 26 to be entered into the three kinds of dichroic mirrors 23, 24 and 25 in a front thereof. Those dichroic mirrors 23, 24 and 25, the liquid crystal panel 22, the projection lens device 21 and the screen 20 have the same functions as in the conventional example shown in FIG. 22, therefore, the detailed explanations of those are omitted here.

On a while, the compulsive cooling of the white light source 28 and the liquid crystal panel (including the polarization plate thereof) is also same to that shown in FIG. 22, therefore, the detailed explanation of it is omitted here.

For realizing an image display device of a projection type being compact in size and of a rear type with using the optical system shown in FIG. 22 or 23, it is essential to shorten the projection distance (i.e., the distance from the projection lens device to the screen), and a wide-angle projection lens device is necessitated.

At this moment, if an ordinal wide-angle projection lens device is used, a ratio of light amount at a peripheral portion decreases down because of a characteristic in distribution of light by the liquid crystal panel. The reason of this will be given in detail. In the optical system of the singular-plate type (using only one piece of the liquid crystal panel), as shown in FIG. 22 or 23, since the dichroic mirrors 23, 24 and 25, which are positioned between the liquid crystal panel 22 and the white light source 28, vary the respective spectrum transmittance and reflectance thereof depending on the incident angles, therefore, the light beam from the white light source 28 comes to be almost in parallel to be radiated upon the liquid crystal panel 22. Also there was already known an apparatus, in which a micro-lens is provided on a light incident surface of the liquid crystal panel 22 for a purpose of increasing the vignetting factor thereof (hereinafter, an explanation will be given on the liquid crystal panel on which the such micro-lens is provided).

A principle light beam of luminous or light flux incident upon the projection lens device 21 from respective object points on the liquid crystal panel 22 comes to be almost in parallel to an optical axis of the projection lens device due to the reason mentioned in the above, and an expansion angle of it is proportional to an aperture number of the micro-lens. If an ordinal projection lens device of wide-angle is used in such the optical system, the light flux which is incident upon the projection lens device 21 from the periphery of the liquid crystal panel is extremely reduced down, thereby the peripheral portion of the enlarged picture projected upon the screen 20. Furthermore, for the projection lens device which is used in the optical system of the image display device of projection type, there are remained many problems to be solved, including followings:

(1) ensuring high focus quality at every corner of the screen;

(2) reducing a F number for purpose of increase in the brightness of the screen;

(3) reducing distortion, since adjustment in the convergence is impossible; and (4) reducing reflection upon the lens surface and suppressing loss of the brightness, thereby ensuring sufficient contrast performance.

On the other hand, in the optical system for projection using the liquid crystal panel according to the conventional art, there are provided cooling fans (not shown in the figure), each one for cooling the white light source 28 or the liquid crystal panel (including the polarization panel) respectively. Therefore, it causes a reason of cost-up of it. Further, reduction of wind noises which are generated by the cooling fans also comes to be a problem to be solved.

SUMMARY OF THE INVENTION

An object of the present invention is, for dissolving the problems mentioned in the above, to provide a projection display apparatus and a projection lens device for use therein, with which the apparatus can be made compact in size, and being suitable to obtain a picture of low image distortion, as well as improving brightness, focus and contrast thereof.

For dissolving the above-mentioned object, in accordance with the present invention, there is provided a projection lens device for projecting an original image being displayed on an image source upon a screen, comprising in sequence from the screen:

a first lens group having a negative refractive power as an entire system thereof;

a second lens group having a positive refractive power as an entire system thereof; and a third lens group having a negative refractive power as an entire system thereof. With such the construction, it is possible to obtain a flat picture image for a wide field angle of 80 degree, therefore, obtaining good focus quality at every corner of the screen. Further, with this construction, since the first lens group and the second lens group of the negative refractive power are positioned symmetrically at both sides of the second lens group of the positive refractive power, thereby it is also possible to suppress distortion at low level.

However, conventionally, the projection lens device of such the construction has a drawback that the first and the third lens groups comes to be large in the lens diameters thereof, thereby increasing production cost thereof. Then, in accordance with the projection lens device of the present invention, the third lens group includes a lens, which has a negative refractive power (with diverging function) of aspherical surface in the vicinity of the optical axis and has a positive refractive power (with condensing function) at periphery portion thereof, thereby reducing the lens diameter as small as possible while maintaining the advantages of the basic structure mentioned in the above.

Further, with provision of an aspherical lens having a positive refractive power (with condensing function) in the vicinity of the optical axis thereof and having a negative or no refractive power (with or almost without diverging function) at periphery portion thereof, and combining it with the aspherical lens of the third lens group mentioned above, it is possible to let it to have a function of a beam expander optical system (with converting the width of luminous flux), which can compress the luminous flux from the liquid crystal panel in the radial direction thereof. As a result of this, since it is possible to decrease the effective height of the object surface, therefore, correction of the aberrations including chromatic aberration of magnification becomes easy. Further, with the projection lens device of such the construction, since the size of an exit pupil, through which the luminous flux forming an image at periphery of the screen passes, is larger than that of the exit pupil on the optical axis thereof, and also since it is a telecentric structure in which a main light of the luminous flux is almost in parallel to the optical axis of the projection lens device, it is possible to ensure sufficient light amount ratio at the periphery. Further, for realizing high focus on entire screen and for obtaining bright picture, in the projection lens device according to the present invention, the aspherical lens is provided at a position where the light flux forming an image at a center of the screen and the light flux forming an image at the most peripheral portion thereof do not overlap each other. With the aspherical lens, a glass one is expensive, therefore an aspherical lens made of plastic material is used. However, the plastic aspherical lens has a significant problem that it fluctuates the refractive power due to changes in refractive index and shape thereof, which is caused by change of temperature or hygroscopic swelling thereof. Therefore, (1) the plastic lens is so formed that it has a thickness as uniform as possible, thereby reducing the fluctuation in the refractive power due to the changes in the refractive index and the shape caused by change of the temperature or the hygroscopic swelling. (2) It is so constructed that the fluctuation in the refractive power, which is obtained from a local shape of the plastic aspherical lens due to changes in the temperature and humidity, is canceled by combining a plurality of the plastic aspherical lenses.

For realizing the high contrast with reducing reflection upon a lens surface, in the projection lens device according to the present invention, loss by the reflection of an image light is reduced by means of optically connecting between the projection lens device and the liquid crystal panel through a medium having refractive index Nd (refractive index with respect to a light of wavelength 587.6 nm) being greater than 1.2. In more concrete, a cooling liquid (medium having the refractive index Nd (refractive index with respect to a light of wavelength 587.6 nm) being greater than 1.2) is fulfilled within a space defined between the projection lens device and the liquid crystal panel, thereby reducing the loss due to the reflection of the image light and enabling the picture of high contrast as well. Further, the liquid crystal panel and the polarizing plate have tendency to decrease the polarization characteristics thereof with increase of the temperature (for instance, at 7° C.), thereby causing the decreasing of the contrast characteristic of the display apparatus. Therefore, according to the present invention, both of those, i.e., the liquid crystal panel and the polarizing plate are cooled by means of a cooling liquid in order to obtain an image of high contrast.

BRIEF DESCRIPTION OF DRAWINGS

FIG. 3 is a vertical cross section view of showing main portions of a rear projection display apparatus, in which the optical system for projection according to present invention is applied to;

FIG. 4 is a vertical cross section view of showing main portions of an another rear projection display apparatus, in which the optical system for projection according to present invention is applied to;

DESCRIPTION OF THE PREFERRED EMBODIMENTS

Figure 1:
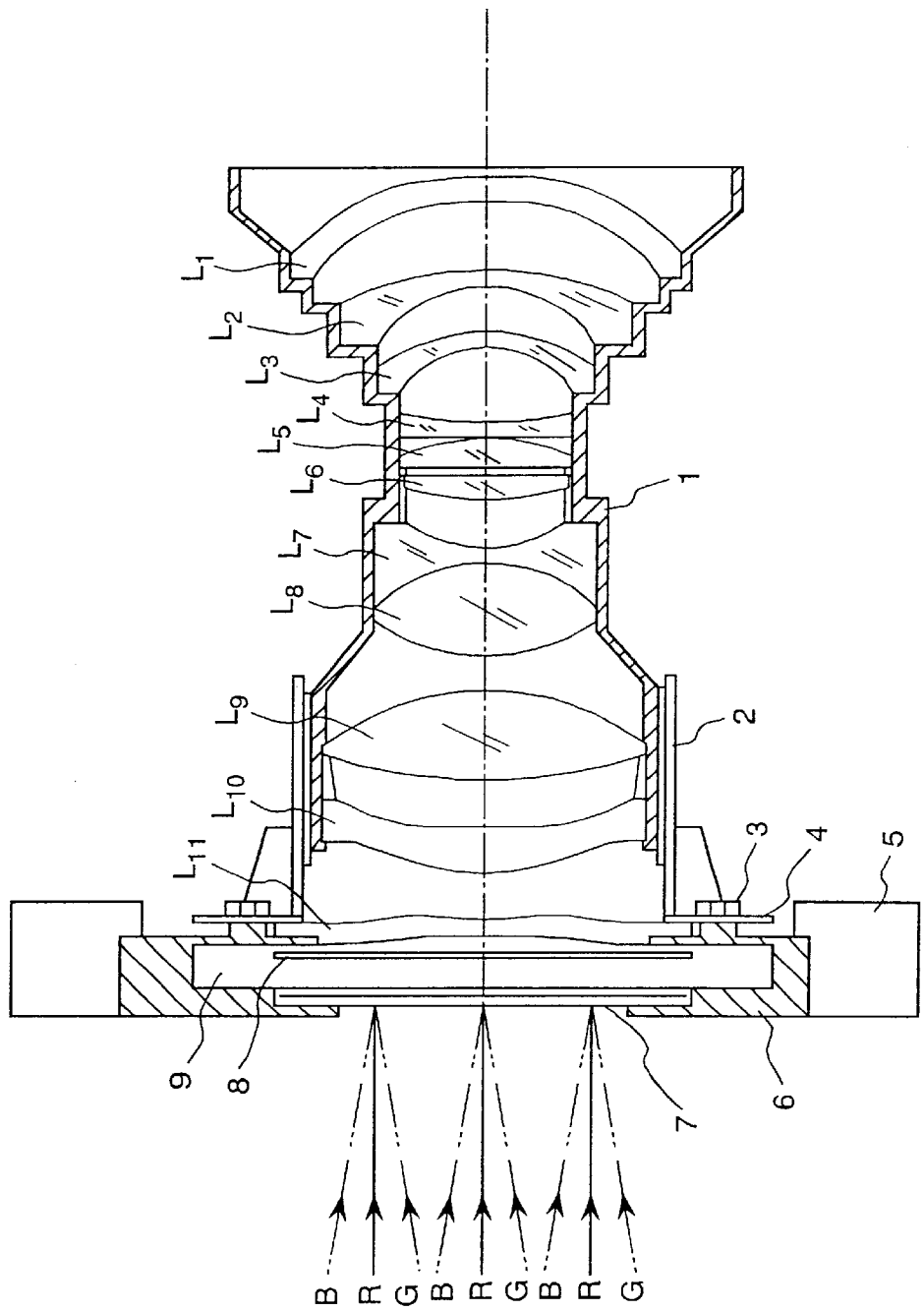
FIG. 1 is a cross section view of showing structure of an embodiment of a projection lens device according to the present invention.

Hereinafter, detailed explanation of the embodiments according to the present invention will be given by referring to attached drawings. FIG. 1 is a cross section view of showing a principal portion of lenses in a projection lens device as an embodiment according to the present invention. In FIG. 1, a reference numeral 7 indicates a liquid crystal panel, 8 a polarization panel provided at an light exit side of the liquid crystal panel 7, 9 cooling liquid, $L_{11}$ an eleventh lens element, $L_{10}$ a tenth lens element, $L_9$ a ninth lens element, $L_8$ an eighth lens element, $L_7$ a seventh lens element, $L_6$ a sixth lens element, $L_5$ a fifth lens element, $L_4$ a fourth lens element, $L_3$ a third lens element, $L_2$ a second lens element, and $L_1$ a first lens element.

The eleventh lens element $L_{11}$ and the liquid crystal panel 7 are respectively fixed to a bracket 6 through each O ring, and in a space obtained therebetween is positioned the polarization plate 8 and is enclosed with the cooling liquid 9. A convection current of this cooling liquid 9 takes heat from the liquid crystal panel and the polarization plate which are heated by absorption of the incident light so as to uniform the temperature thereof, and the heat is radiated outside by means of a radiator plate 5 which is formed in the bracket 6. On a side surface of the liquid crystal panel 7, upon which an irradiation light is incident, is preferably to be treated with an anti-reflection coating.

All of lenses from the first lens element to the fourth lens element have negative refractive powers and form a first lens group. The lenses from the fifth lens element to the tenth lens element form a second lens group so as to carry a positive refractive power in an entire system of the projection lens device. (However, the refractive power of the combined lenses (i.e., the seventh lens element and the eighth lens element) which are laminated or cemented for reducing chromatic aberration on an optical axis is a negative value.)

Those lenses of the first group to the second group are mounted inside of an inner lens-barrel 1 and it is fixed to an outer lens-barrel 2 by screws (not shown in the figure). Further, the outer lens-barrel 2 is fixed on the bracket 6 by screws (not shown in the figure) through a presser 4. And, in such the structure, an image on the liquid crystal panel as an object plane is extensively projected upon a screen (not shown in the figure).

In a calculation of the focus distance of the third lens group, it is calculated including the eleventh lens $L_{11}$, the cooling liquid 9, and the liquid crystal panel 7.

Figure 2:
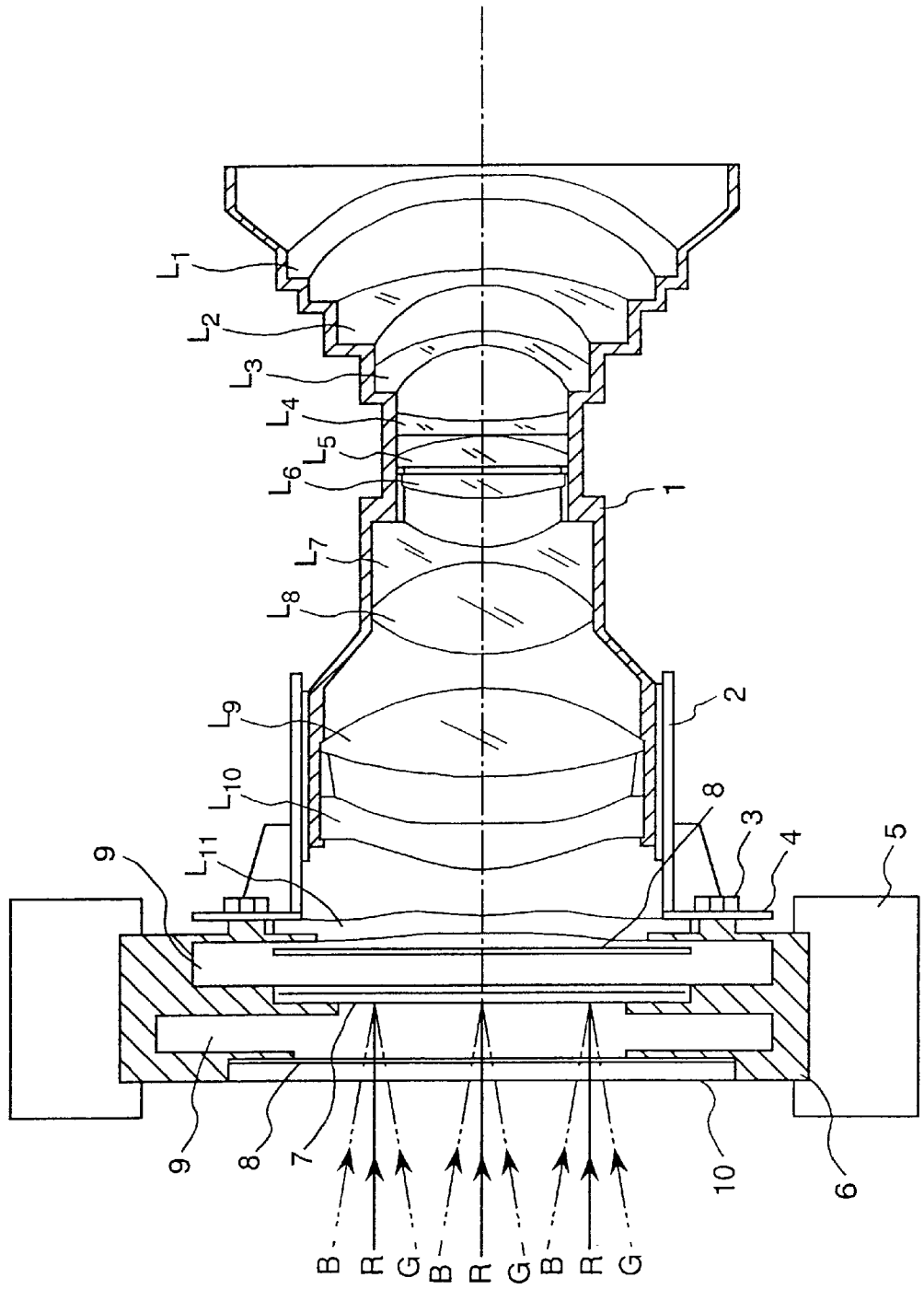
FIG. 2 is a cross section view of showing structure of an another embodiment of the projection lens device according to the present invention.

FIG. 2 is a cross section view of showing a principal portion of lenses in a projection lens device as an another embodiment according to the present invention. In the same figure, the same elements are attached with the same reference numerals as in FIG. 1. The difference from the embodiment shown in FIG. 1 lies in that the cooling liquid 9 is enclosed in spaces defined at both side of the liquid crystal panel 7, and it is the same that the convection current of this cooling liquid 9 takes heat from the liquid crystal panel and the polarization plate which are heated by absorption of the incident light so as to uniform the temperature thereof, and that the heat is radiated outside by means of a radiator plate 5 which is formed in the bracket 6. In the embodiment shown in FIG. 2, though the polarization plate, being positioned at the side of liquid crystal panel 7 upon which the irradiation light is incident, is fixed by bonding it on a protection panel 10 at the light incident side of liquid crystal panel 7, however, if it is so positioned that the cooling liquid contacts with the both surface there, in the same manner of the polarization plate positioned at side of the liquid crystal panel 7 from which the light emits, it is needless to say that the increase of the temperature in the polarization plate can be reduced more. On a side surface of the protection panel 10, upon which the irradiation light is incident, is preferably to be treated with an anti-reflection coating.

Figure 5:
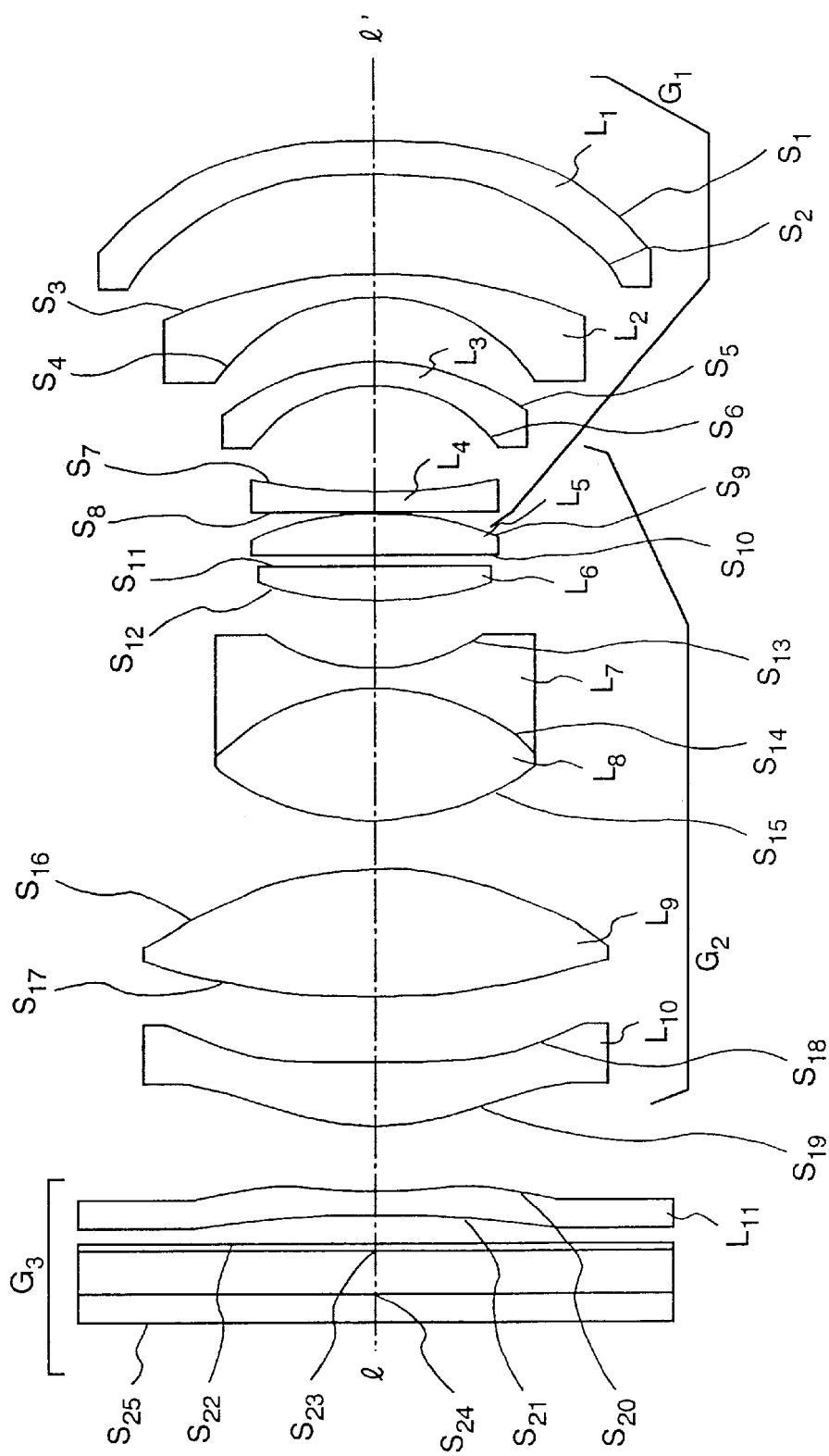
FIG. 5 is a cross section view of showing positions of lens elements in a projection lens device according to the present invention.

FIG. 5 is a cross section view of showing positions of lens elements in a projection lens device according to the present invention, and concrete lens data obtained therefrom is shown on a Table 3.

Figure 6:
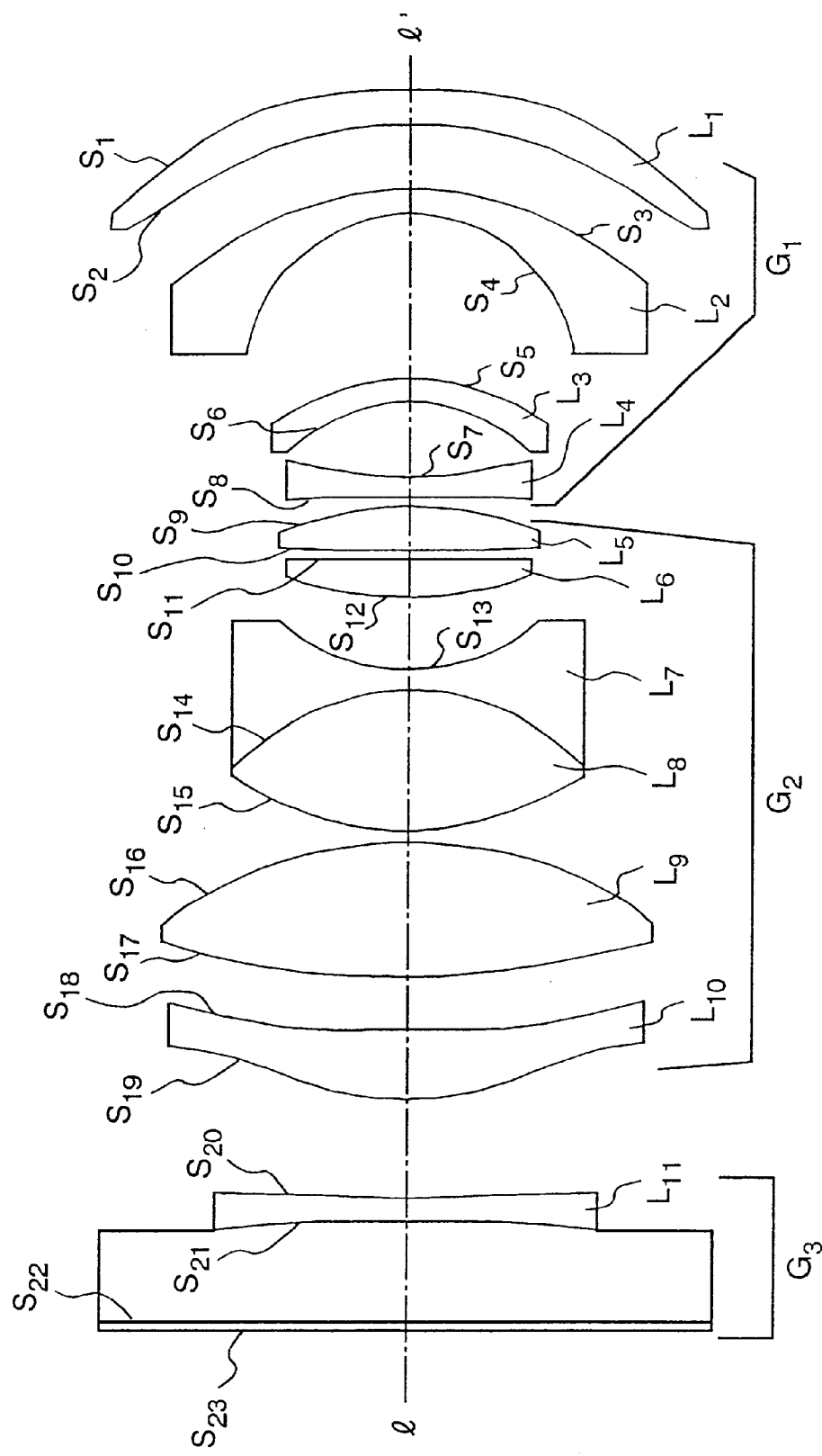
FIG. 6 is a cross section view of showing positions of lens elements in a variation of the projection lens device according to the present invention.

FIG. 6 is also a cross section view of showing positions of lens elements in a projection lens device according to the present invention, and concrete lens data obtained therefrom is shown on a Table 5.

Figure 7:
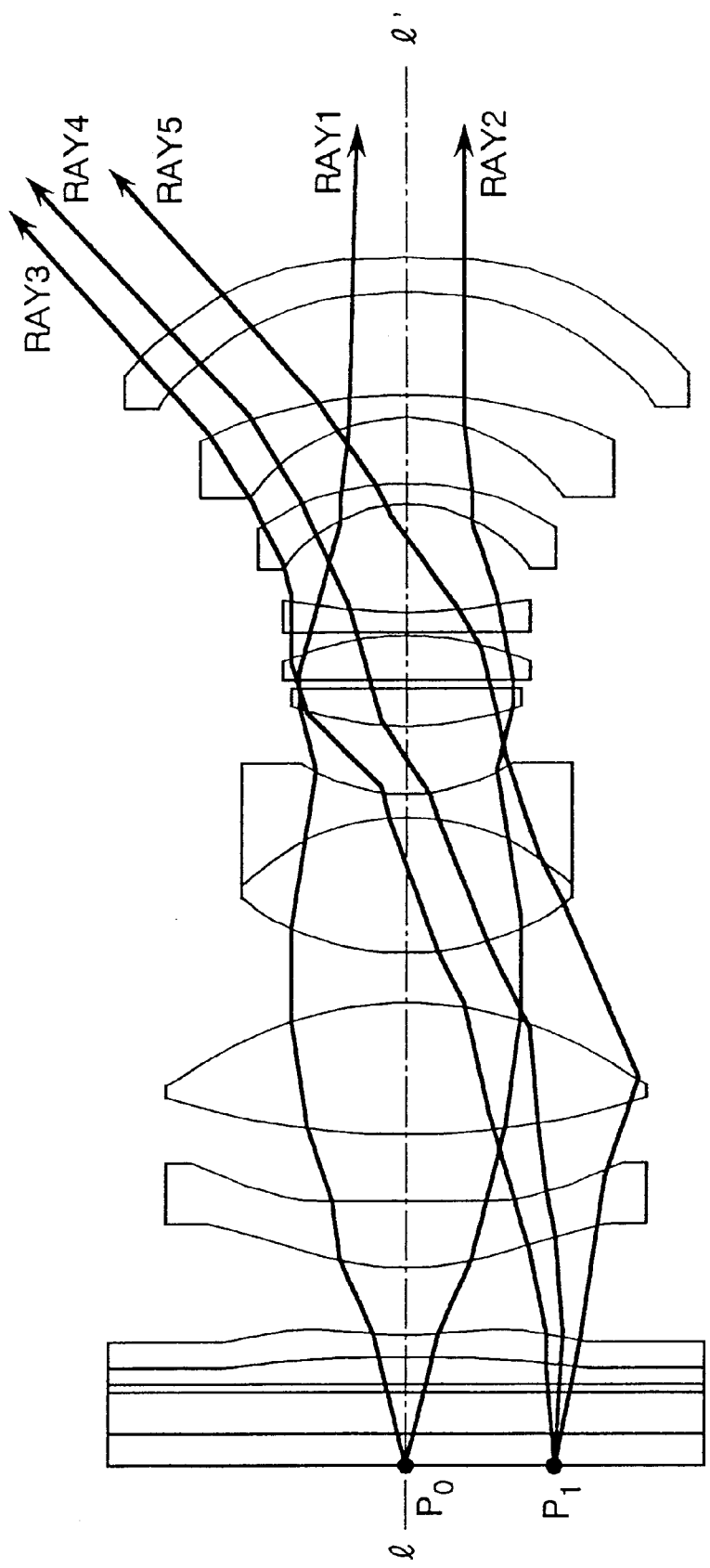
FIG. 7 is a cross section view of showing positions of lens elements in an another variation of the projection lens device according to the present invention.

FIG. 7 is also a cross section view of showing positions of lens elements in the same embodiment as shown in FIG. 1, and further there are shown tracks of light beams therein.

Figure 8:
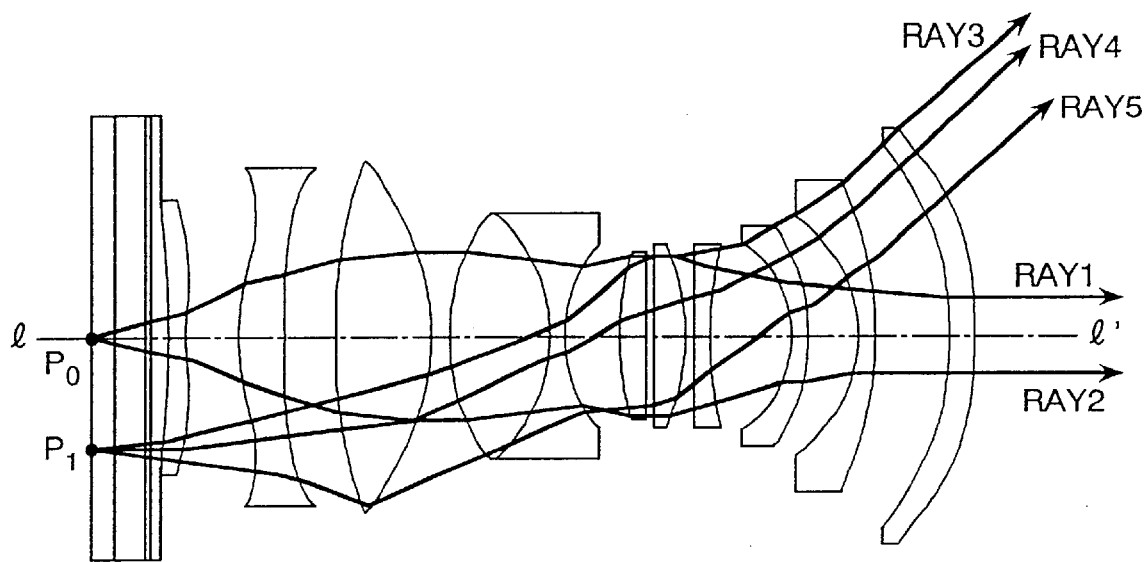
FIG. 8 is a cross section view of showing positions of lens elements in a further other variation of the projection lens device according to the present invention.

FIG. 8 is also a cross section view of showing positions of lens elements in the another embodiment with tracks of light beams therein, and concrete lens data obtained therefrom is shown on a Table 3.

Figure 9:
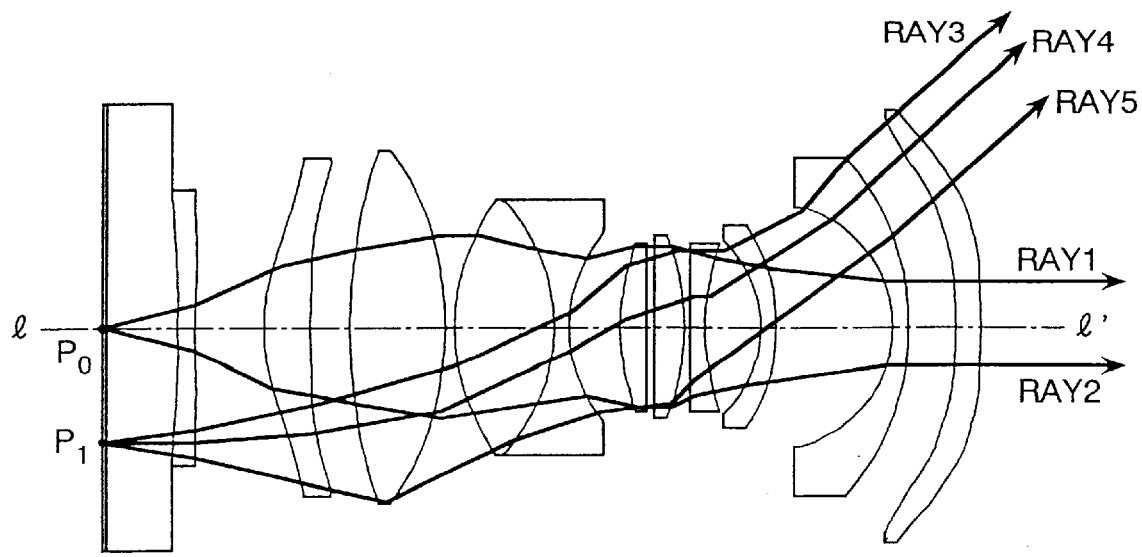
FIG. 9 is a cross section view of showing positions of lens elements in a further other variation of the projection lens device according to the present invention.

Similarly, FIG. 9 is also a cross section view of showing positions of lens elements in the other embodiment with tracks of light beams therein, and concrete lens data obtained therefrom is shown on a Table 5.

Figure 10:
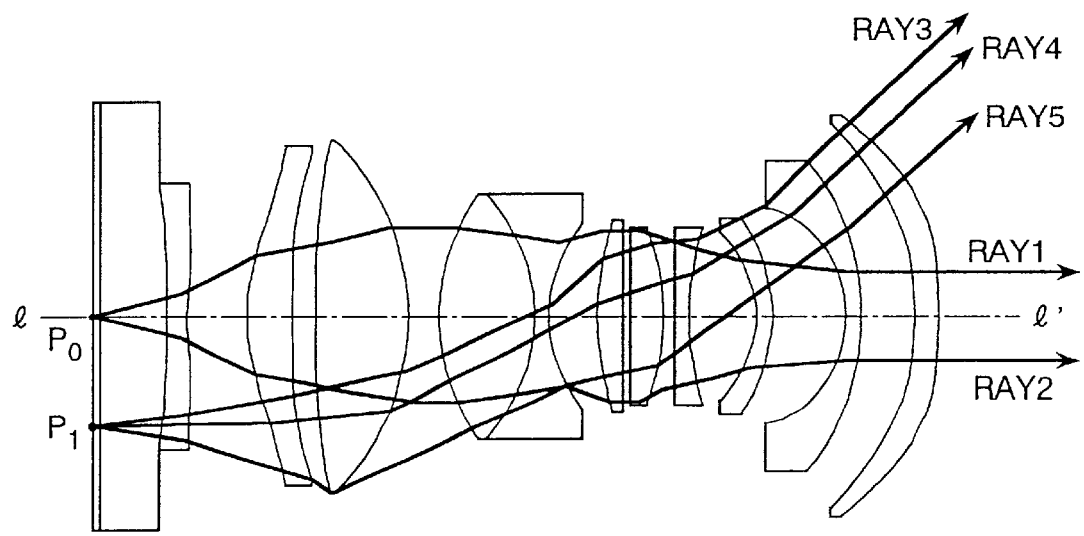
FIG. 10 is a cross section view of showing positions of lens elements in a further other variation of the projection lens device according to the present invention.

FIG. 10 is also a cross section view of showing positions of lens elements in the other embodiment with tracks of light beams therein, and concrete lens data obtained therefrom is shown on a Table 3.

Figure 11:
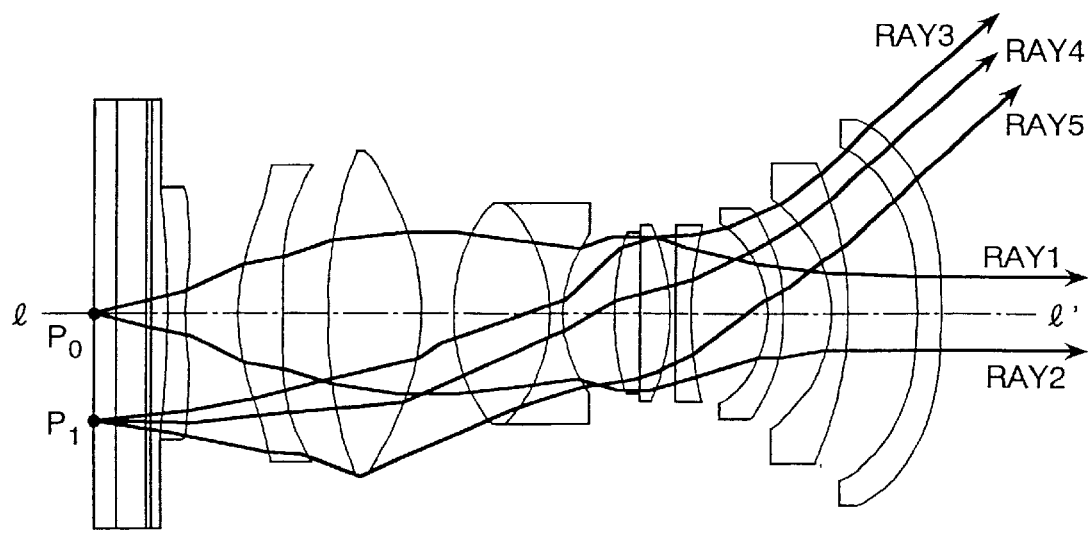
FIG. 11 is a cross section view of showing positions of lens elements in a further other variation of the projection lens device according to the present invention.

FIG. 11 is also a cross section view of showing positions of lens elements in the other embodiment with tracks of light beams therein, and concrete lens data obtained therefrom is shown on a Table 9.

In the figures showing the positions of the lens elements in the various projection lens devices shown in FIGS. 5 to 11, however, there are omitted the structural elements other than the lens barrel for convenience of explanation.

Figure 3:
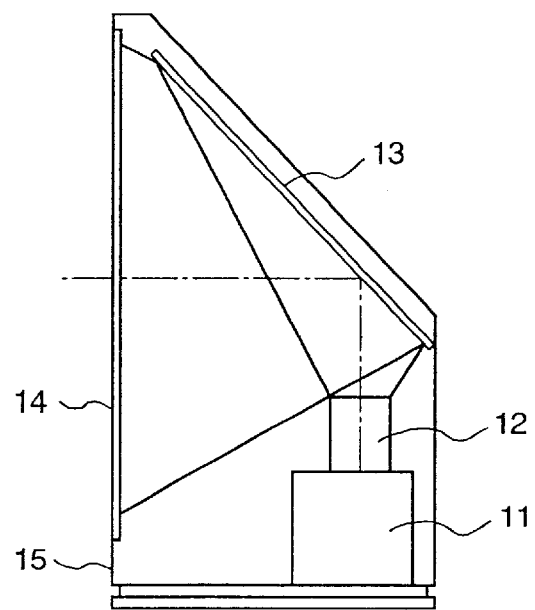
Figure 4:
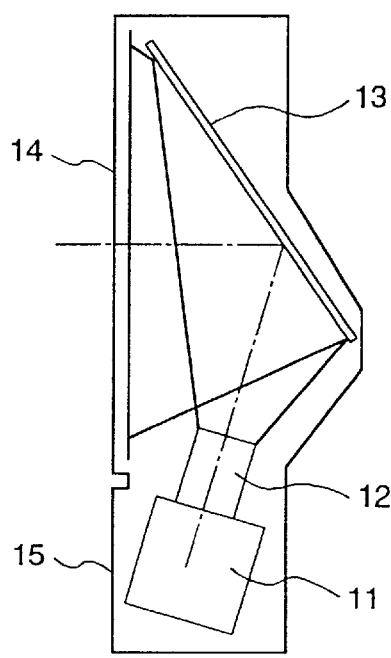

The projection lens device of the embodiment according to the present invention is so constructed that the best performance can be obtained when the image displayed on the liquid crystal panel of 1.6 inches is expansively projected on a screen of 50 inches. A half field angle of the projection lens is 44.3 degree from the Tables 1 to 7 and the Tables 9 and 10, or is 47.6 degree from the Table 8, thereby achieving a wide field angle. Therefore, it is possible to realize a set being fully compact in size with a single piece of a turning or reflecting mirror 13 as shown in FIGS. 3 and 4. With the structure shown in FIG. 3 can be realized a set which is suppressed in the height thereof, and with FIG. 4 a set which is greatly reduced in the depth thereof.

The concrete lens data which are obtained from the projection lens devices according to the present invention will be shown in the following Tables 1 to 10.

TABLE 1

| Lens | Surface No. | Curvature Radius (mm) | Distance between Surfaces (mm) | Refractive Index (545 nm)/ Abbe's No. (vd) |
|---|---|---|---|---|
| Screen |  | ∞ | 650.0 | 1.0 |
| 1st Lens | $S_1$ | −147.96 | 4.55 | 1.49345/58 |
|  | $S_2$ | −77.773 | 13.427 | 1.0 |
| 2nd Lens | $S_3$ | −70.570 | 3.00 | 1.51877/64.2 |
|  | $S_4$ | −25.860 | 9.00 | 1.0 |
| 3rd Lens | $S_5$ | −35.223 | 3.00 | 1.51877/64.2 |
|  | $S_6$ | −20.500 | 14.604 | 1.0 |
| 4th Lens | $S_7$ | 82.0 | 2.70 | 1.51877/64.2 |
|  | $S_8$ | −500.0 | 0.5221 | 1.0 |
| 5th Lens | $S_9$ | −43.019 | 5.700 | 1.85530/23.8 |
|  | $S_{10}$ | 1000.0 | 1.309 | 1.0 |
| 6th Lens | $S_{11}$ | −2334.27 | 4.9 | 1.83945/37.3 |
|  | $S_{12}$ | 49.0 | 9.152 | 1.0 |
| 7th Lens | $S_{13}$ | 27.05 | 3.0 | 1.85530/23.8 |
| 8th Lens | $S_{14}$ | −30.5 | 18.0 | 1.69988/55.5 |
|  | $S_{15}$ | 37.0 | 6.905 | 1.0 |
| 9th Lens | $S_{16}$ | −49.93 | 17.5 | 1.62293/60.3 |
|  | $S_{17}$ | 100.0 | 8.989 | 1.0 |
| 10th Lens | $S_{18}$ | −250.0 | 8.7 | 1.49345/58 |
|  | $S_{19}$ | 39.0 | 8.914 | 1.0 |
| 11th Lens | $S_{20}$ | 49.0 | 3.3 | 1.49345/58 |
|  | $S_{21}$ | −210.0 |  |  |
| Cooling Liqid | $S_{22}$ | ∞ | 3.24 | 1.44712 |
| Polarization Plate | $S_{23}$ | ∞ | 0.9 | 1.51877 |
| Cooling Liqid | $S_{24}$ | ∞ | 5.5 | 1.44712 |
| Panel | $S_{25}$ | ∞ | 4.1 | 1.46624 |

(Aspherical Surface Data)

| Lens Surface | Surface No. | CC | AE | AF | AG | AH |
|---|---|---|---|---|---|---|
| 1st Lens | $S_1$ | 13.914536 | −8.930730 E-6 | 5.672550 E-9 | −2.741764 E-12 | 9.959100 E-16 |
|  | $S_2$ | 4.218417 | −8.588282 E-6 | 5.685241 E-9 | −4.928899 E-13 | 5.024743 E-16 |
| 10th Lens | $S_{18}$ | −79.19278 | 2.027210 E-5 | −1.013917 E-8 | −9.933592 E-12 | 8.428124 E-15 |
|  | $S_{19}$ | 0.5936647 | −4.771457 E-6 | 6.126851 E-8 | 1.836117 E-11 | −1.539515 E-14 |
| 11th Lens | $S_{80}$ | 1.5313454 | −4.771457 E-5 | 6.126851 E-8 | −4.286456 E-11 | 1.47419 E-14 |
|  | $S_{21}$ | — | — | — | — | — |

Fno = 1.38
Lens Length = 160.91 (mm)
Field Angle 2 θ = 88.7 (degree)

TABLE 2

| Lens | Surface No. | Curvature Radius (mm) | Distance between Surfaces (mm) | Refractive Index (545 nm)/Abbe's No. (vd) |
|---|---|---|---|---|
| Screen | | ∞ | 650.0 | 1.0 |
| 1st Lens | $S_1$ | −147.96 | 4.55 | 1.49345/58 |
| | $S_2$ | −83.094 | 13.427 | 1.0 |
| 2nd Lens | $S_3$ | −70.100 | 3.00 | 1.51877/64.2 |
| | $S_4$ | −25.860 | 9.00 | 1.0 |
| 3rd Lens | $S_5$ | −35.140 | 3.00 | 1.51877/64.2 |
| | $S_6$ | −20.500 | 14.604 | 1.0 |
| 4th Lens | $S_7$ | 79.136 | 2.70 | 1.51877/64.2 |
| | $S_8$ | −500.0 | 0.7176 | 1.0 |
| 5th Lens | $S_9$ | −43.000 | 5.700 | 1.85530/23.8 |
| | $S_{10}$ | 1000.0 | 1.309 | 1.0 |
| 6th Lens | $S_{11}$ | −2500.27 | 4.9 | 1.83945/37.3 |
| | $S_{12}$ | 49.917 | 9.431 | 1.0 |
| 7th Lens | $S_{13}$ | 27.00 | 3.0 | 1.85530/23.8 |
| 8th Lens | $S_{14}$ | −30.5 | 18.0 | 1.69988/55.5 |
| | $S_{15}$ | 37.0 | 6.114 | 1.0 |
| 9th Lens | $S_{16}$ | −48.60 | 17.5 | 1.62293/60.3 |
| | $S_{17}$ | 100.0 | 8.989 | 1.0 |
| 10th Lens | $S_{18}$ | −250.0 | 8.7 | 1.49345/58 |
| | $S_{19}$ | 39.0 | 8.795 | 1.0 |
| 11th Lens | $S_{20}$ | 49.0 | 3.3 | 1.49345/58 |
| | $S_{21}$ | −210.0 | | |
| Cooling Liqid | $S_{22}$ | ∞ | 3.24 | 1.44712 |
| Polarization Plate | $S_{23}$ | ∞ | 0.9 | 1.51877 |
| Cooling Liqid | $S_{24}$ | ∞ | 5.5 | 1.44712 |
| Panel | $S_{25}$ | ∞ | 4.1 | 1.46624 |

(Aspherical Surface Data)

| Lens Surface | Surface No. | CC | AE | AF | AG | AH |
|---|---|---|---|---|---|---|
| 1st Lens | $S_1$ | 8.100062 | −9.5148507 E-6 | 5.5517724 E-9 | −2.6105671 E-12 | 9.5084573 E-16 |
| | $S_2$ | 3.530663 | −9.4269508 E-6 | 5.1512821 E-9 | 9.4842623 E-13 | −5.6889401 E-16 |
| 10th Lens | $S_{18}$ | −63.095383 | 1.9257495 E-5 | −1.1970556 E-8 | −7.759628 E-12 | 9.6112320 E-15 |
| | $S_{19}$ | 0.6470599 | −8.9469240 E-6 | −1.230832 E-8 | 1.3320458 E-11 | −1.1259568 E-14 |
| 11th Lens | $S_{80}$ | 1.5147657 | −5.080020 E-5 | 6.9219197 E-8 | −5.3315907 E-11 | 2.1057202 E-14 |
| | $S_{21}$ | — | — | — | — | — |

Fno = 1.35
Lens Length = 160.48 (mm)
Field Angle 2 θ = 88.7 (degree)

TABLE 3

| Lens | Surface No. | Curvature Radius (mm) | Distance between Surfaces (mm) | Refractive Index (545 nm)/Abbe's No. (vd) |
|---|---|---|---|---|
| Screen | | ∞ | 650.0 | 1.0 |
| 1st Lens | $S_1$ | −147.96 | 4.55 | 1.49345/58 |
| | $S_2$ | −97.030 | 13.427 | 1.0 |
| 2nd Lens | $S_3$ | −70.100 | 3.00 | 1.51877/64.2 |
| | $S_4$ | −25.700 | 9.00 | 1.0 |
| 3rd Lens | $S_5$ | −35.429 | 3.00 | 1.51877/64.2 |
| | $S_6$ | −20.500 | 14.604 | 1.0 |
| 4th Lens | $S_7$ | 73.269 | 2.70 | 1.51877/64.2 |
| | $S_8$ | −500.0 | 2.0355 | 1.0 |
| 5th Lens | $S_9$ | −43.019 | 5.700 | 1.85530/23.8 |
| | $S_{10}$ | 750.0 | 1.3161 | 1.0 |
| 6th Lens | $S_{11}$ | −2500.0 | 4.9 | 1.83945/37.3 |
| | $S_{12}$ | 53.05 | 9.7245 | 1.0 |
| 7th Lens | $S_{13}$ | 27.05 | 3.0 | 1.85530/23.8 |
| 8th Lens | $S_{14}$ | −30.5 | 18.0 | 1.69988/55.5 |
| | $S_{15}$ | 38.186 | 3.4115 | 1.0 |
| 9th Lens | $S_{16}$ | −48.256 | 17.5 | 1.62293/60.3 |
| | $S_{17}$ | 100.0 | 8.9737 | 1.0 |

TABLE 3-continued

| | | | | |
|---|---|---|---|---|
| 10th Lens | $S_{18}$ | −250.0 | 8.7 | 1.49345/58 |
| | $S_{19}$ | 39.0 | 9.5925 | 1.0 |
| 11th Lens | $S_{20}$ | 49.0 | 3.3 | 1.49345/58 |
| | $S_{21}$ | −210.0 | | |
| Cooling Liqid | $S_{22}$ | ∞ | 3.24 | 1.44712 |
| Polarization Plate | $S_{23}$ | ∞ | 0.9 | 1.51877 |
| Cooling Liqid | $S_{24}$ | ∞ | 5.5 | 1.44712 |
| Panel | $S_{25}$ | ∞ | 4.1 | 1.46624 |

(Aspherical Surface Data)

| Lens Surface | Surface No. | CC | AE | AF | AG | AH |
|---|---|---|---|---|---|---|
| 1st Lens | $S_1$ | 10.716287 | −8.6019281 E-6 | 5.024550 E-9 | −2.4379249 E-12 | 9.5389081 E-16 |
| | $S_2$ | 1.632086 | −8.8180996 E-6 | 4.6148401 E-9 | 3.2887316 E-13 | −3.7371178 E-16 |
| 10th Lens | $S_{18}$ | −199.15547 | 1.661542 E-5 | −1.453855 E-8 | −5.9306110 E-12 | 1.2316672 E-14 |
| | $S_{19}$ | 0.470848 | −9.8785667 E-6 | −1.3767643 E-8 | 5.7808515 E-12 | −1.3165310 E-15 |
| 11th Lens | $S_{80}$ | 1.3577642 | −5.1724826 E-5 | 7.6189598 E-8 | −7.6165477 E-11 | 3.9655867 E-14 |
| | $S_{21}$ | — | — | — | — | — |

Fno = 1.36
Lens Length = 160.17 (mm)
Field Angle 2 θ = 88.7 (degree)

TABLE 4

| Lens | Surface No. | Curvature Radius (mm) | Distance between Surfaces (mm) | Refractive Index (545 nm)/ Abbe's No. (vd) |
|---|---|---|---|---|
| Screen | | ∞ | 650.0 | 1.0 |
| 1st Lens | $S_1$ | −147.96 | 4.55 | 1.49345/58 |
| | $S_2$ | −135.86 | 10.416 | 1.0 |
| 2nd Lens | $S_3$ | −64.812 | 3.00 | 1.51877/64.2 |
| | $S_4$ | −21.182 | 16.00 | 1.0 |
| 3rd Lens | $S_5$ | −34.184 | 3.00 | 1.51877/64.2 |
| | $S_6$ | −22.000 | 10.385 | 1.0 |
| 4th Lens | $S_7$ | 63.791 | 2.70 | 1.51877/64.2 |
| | $S_8$ | −500.0 | 1.9410 | 1.0 |
| 5th Lens | $S_9$ | −43.000 | 5.700 | 1.85530/23.8 |
| | $S_{10}$ | 750.0 | 1.4043 | 1.0 |
| 6th Lens | $S_{11}$ | −2500.0 | 4.9 | 1.83945/37.3 |
| | $S_{12}$ | 48.378 | 8.9292 | 1.0 |
| 7th Lens | $S_{13}$ | 27.00 | 3.0 | 1.85530/23.8 |
| 8th Lens | $S_{14}$ | −30.5 | 18.0 | 1.69988/55.5 |
| | $S_{15}$ | 38.718 | 2.855 | 1.0 |
| 9th Lens | $S_{16}$ | −49.773 | 17.5 | 1.62293/60.3 |
| | $S_{17}$ | 100.00 | 8.7491 | 1.0 |
| 10th Lens | $S_{18}$ | −250.0 | 8.7 | 1.49345/58 |
| | $S_{19}$ | 39.0 | 10.14 | 1.0 |
| 11th Lens | $S_{20}$ | 49.0 | 3.3 | 1.49345/58 |
| | $S_{21}$ | −210.0 | | |
| Cooling Liqid Panel | $S_{22}$ | ∞ | 12.85 | 1.44712 |
| | $S_{23}$ | ∞ | 0.8 | 1.46624 |

(Aspherical Surface Data)

| Lens Surface | Surface No. | CC | AE | AF | AG | AH |
|---|---|---|---|---|---|---|
| 1st Lens | $S_1$ | 11.233818 | −8.9794621 E-6 | 4.5678057 E-9 | −2.6952971 E-12 | 9.9702025 E-16 |
| | $S_2$ | 2.5130796 | −8.9388432 E-6 | 4.3735433 E-9 | 2.685713 E-13 | −4.5959182 E-16 |
| 10th Lens | $S_{18}$ | −165.54256 | 1.6010483 E-5 | −1.2817797 E-8 | −4.2772799 E-12 | −7.971732 E-15 |
| | $S_{19}$ | 0.04138567 | −7.2115198 E-6 | −1.1069138 E-8 | 4.5322348 E-12 | −1.7162394 E-16 |

TABLE 4-continued

| | | | | | | |
|---|---|---|---|---|---|---|
| 11th Lens | $S_{80}$ | −11.938299 | −3.2883123 E-5 | 4.8532463 E-8 | −4.6334145 E-11 | 2.9198554 E-14 |
| | $S_{21}$ | — | — | — | — | — |

Fno = 1.37
Lens Length = 158.82 (mm)
Field Angle 2 θ = 88.7 (degree)

TABLE 5

| Lens | Surface No. | Curvature Radius (mm) | Distance between Surfaces (mm) | Refractive Index (545 nm)/ Abbe's No. (vd) |
|---|---|---|---|---|
| Screen | | ∞ | 650.0 | 1.0 |
| 1st Lens | $S_1$ | −147.96 | 4.55 | 1.49345/58 |
| | $S_2$ | −86.767 | 8.4469 | 1.0 |
| 2nd Lens | $S_3$ | −44.842 | 3.00 | 1.51877/64.2 |
| | $S_4$ | −21.182 | 21.00 | 1.0 |
| 3rd Lens | $S_5$ | −30.878 | 3.00 | 1.51877/64.2 |
| | $S_6$ | −20.700 | 9.7495 | 1.0 |
| 4th Lens | $S_7$ | 53.871 | 2.70 | 1.51877/64.2 |
| | $S_8$ | −500.0 | 1.1884 | 1.0 |
| 5th Lens | $S_9$ | −43.164 | 5.700 | 1.85530/23.8 |
| | $S_{10}$ | 750.0 | 1.0794 | 1.0 |
| 6th Lens | $S_{11}$ | −2500.0 | 4.9 | 1.83945/37.3 |
| | $S_{12}$ | 46.069 | 8.9167 | 1.0 |
| 7th Lens | $S_{13}$ | 27.00 | 3.0 | 1.85530/23.8 |
| 8th Lens | $S_{14}$ | −30.5 | 18.0 | 1.69988/55.5 |
| | $S_{15}$ | 39.041 | 1.5745 | 1.0 |
| 9th Lens | $S_{16}$ | −54.386 | 17.5 | 1.62293/60.3 |
| | $S_{17}$ | 100.0 | 6.7988 | 1.0 |
| 10th Lens | $S_{18}$ | −250.0 | 8.7 | 1.49345/58 |
| | $S_{19}$ | 39.0 | 12.534 | 1.0 |
| 11th Lens | $S_{20}$ | 49.0 | 3.3 | 1.49345/58 |
| | $S_{21}$ | −210.0 | | |
| Cooling Liqid | $S_{22}$ | ∞ | 12.850 | 1.44712 |
| Panel | $S_{23}$ | ∞ | 0.8 | 1.46624 |

(Aspherical Surface Data)

| Lens Surface | Surface No. | CC | AE | AF | AG | AH |
|---|---|---|---|---|---|---|
| 1st Lens | $S_1$ | 11.441268 | −9.0499234 E-6 | 5.6201905 E-9 | −3.1693155 E-12 | 1.2049016 E-15 |
| | $S_2$ | 1.2263718 | −8.3923887 E-6 | 4.0407251 E-9 | 1.1534393 E-12 | −6.1877154 E-16 |
| 10th Lens | $S_{18}$ | 62.173401 | 1.4569459 E-5 | −9.4866586 E-9 | −1.2774174 E-12 | 3.626724 E-15 |
| | $S_{19}$ | −0.54561371 | −3.2846974 E-6 | −7.9516838 E-9 | 4.9922046 E-12 | −5.0510184 E-16 |
| 11th Lens | $S_{80}$ | −3.1018276 | −3.4424069 E-5 | 5.1272441 E-8 | −5.1093518 E-11 | 3.1473061 E-14 |
| | $S_{21}$ | — | — | — | — | — |

Fno = 1.37
Lens Length = 159.29 (mm)
Field Angle 2 θ = 88.7 (degree)

TABLE 6

| Lens | Surface No. | Curvature Radius (mm) | Distance between Surfaces (mm) | Refractive Index (545 nm)/ Abbe's No. (vd) |
|---|---|---|---|---|
| Screen | | ∞ | 650.0 | 1.0 |
| 1st Lens | $S_1$ | −147.96 | 4.55 | 1.49345/58 |
| | $S_2$ | −86.767 | 5.2205 | 1.0 |
| 2nd Lens | $S_3$ | −44.193 | 3.00 | 1.51877/64.2 |
| | $S_4$ | −21.182 | 23.562 | 1.0 |
| 3rd Lens | $S_5$ | −29.789 | 3.00 | 1.51877/64.2 |
| | $S_6$ | −20.100 | 9.6232 | 1.0 |
| 4th Lens | $S_7$ | 48.552 | 3.00 | 1.51877/64.2 |
| | $S_8$ | −660.11 | 1.1913 | 1.0 |
| 5th Lens | $S_9$ | −43.164 | 6.200 | 1.85530/23.8 |
| | $S_{10}$ | 500.0 | 1.5180 | 1.0 |

TABLE 6-continued

| Lens | Surface No. | | | |
|---|---|---|---|---|
| 6th Lens | S$_{11}$ | −2500.0 | 5.4 | 1.83945/37.3 |
| | S$_{12}$ | 44.783 | 7.9898 | 1.0 |
| 7th Lens | S$_{13}$ | 27.05 | 3.0 | 1.85530/23.8 |
| 8th Lens | S$_{14}$ | −30.5 | 17.0 | 1.69988/55.5 |
| | S$_{15}$ | 37.021 | 5.0202 | 1.0 |
| 9th Lens | S$_{16}$ | −51.145 | 17.5 | 1.62293/60.3 |
| | S$_{17}$ | 150.0 | 6.1451 | 1.0 |
| 10th Lens | S$_{18}$ | −250.0 | 8.70 | 1.49345/58 |
| | S$_{19}$ | 39.0 | 12.065 | 1.0 |
| 11th Lens | S$_{20}$ | 49.0 | 3.3 | 1.49345/58 |
| | S$_{21}$ | −210.0 | | |
| Cooling Liqid | S$_{22}$ | ∞ | 12.60 | 1.44712 |
| Panel | S$_{23}$ | ∞ | 1.1 | 1.53994 |

(Aspherical Surface Data)

| Lens Surface | Surface No. | CC | AE | AF | AG | AH |
|---|---|---|---|---|---|---|
| 1st Lens | S$_1$ | 12.396640 | −9.6932918 E-6 | 5.8600449 E-9 | −3.5467193 E-12 | 1.1651675 E-15 |
| | S$_2$ | 1.4927969 | −8.5512047 E-6 | 4.0863171 E-9 | 1.1881694 E-13 | −7.6277011 E-16 |
| 10th Lens | S$_{18}$ | 61.316223 | 1.4110056 E-5 | −9.7274260 E-8 | −9.5959612 E-13 | 2.6249327 E-15 |
| | S$_{19}$ | −0.35597545 | −3.6251358 E-6 | −9.1730215 E-9 | 6.9305013 E-12 | −2.5503857 E-15 |
| 11th Lens | S$_{80}$ | 0.77164775 | −3.6585247 E-5 | 4.5280469 E-8 | −4.7434931 E-11 | 3.0699276 E-14 |
| | S$_{21}$ | — | — | — | — | — |

Fno = 1.40
Lens Length = 160.69 (mm)
Field Angle 2 θ = 88.7 (degree)

TABLE 7

| Lens | Surface No. | Curvature Radius (mm) | Distance between Surfaces (mm) | Refractive Index (545 nm)/ Abbe's No. (vd) |
|---|---|---|---|---|
| Screen | | ∞ | 650.0 | 1.0 |
| 1st Lens | S$_1$ | −147.96 | 4.55 | 1.49345/58 |
| | S$_2$ | −86.767 | 9.5633 | 1.0 |
| 2nd Lens | S$_3$ | −45.966 | 3.00 | 1.51877/64.2 |
| | S$_4$ | −21.182 | 13.835 | 1.0 |
| 3rd Lens | S$_5$ | −28.392 | 3.00 | 1.51877/64.2 |
| | S$_6$ | −20.100 | 12.497 | 1.0 |
| 4th Lens | S$_7$ | 51.781 | 3.00 | 1.51877/64.2 |
| | S$_8$ | −660.11 | 1.9801 | 1.0 |
| 5th Lens | S$_9$ | −43.164 | 6.200 | 1.85530/23.8 |
| | S$_{10}$ | 500.0 | 1.518 | 1.0 |
| 6th Lens | S$_{11}$ | −2500.0 | 5.4 | 1.83945/37.3 |
| | S$_{12}$ | 49.125 | 8.6529 | 1.0 |
| 7th Lens | S$_{13}$ | 27.00 | 3.0 | 1.85530/23.8 |
| 8th Lens | S$_{14}$ | −30.5 | 17.0 | 1.69988/55.5 |
| | S$_{15}$ | 36.448 | 6.8388 | 1.0 |
| 9th Lens | S$_{16}$ | −45.598 | 17.5 | 1.62293/60.3 |
| | S$_{17}$ | 175.0 | 4.294 | 1.0 |
| 10th Lens | S$_{18}$ | −250.0 | 8.7 | 1.49345/58 |
| | S$_{19}$ | 39.0 | 11.608 | i.0 |
| 11th Lens | S$_{20}$ | 49.0 | 3.3 | 1.49345/58 |
| | S$_{21}$ | −210.0 | | |
| Cooling Liqid | S$_{22}$ | ∞ | 12.60 | 1.44712 |
| Panel | S$_{23}$ | ∞ | 1.1 | 1.53994 |

(Aspherical Surface Data)

| Lens Surface | Surface No. | CC | AE | AF | AG | AH |
|---|---|---|---|---|---|---|
| 1st Lens | S$_1$ | 11.467263 | −1.1059302 E-6 | 6.3732912 E-9 | −3.3323986 E-12 | 9.9280965 E-16 |
| | S$_2$ | 2.4378862 | −1.0824278 E-6 | 5.3335931 E-9 | 1.4388499 E-13 | −1.0856536 E-15 |
| 10th Lens | S$_{18}$ | 59.444626 | 1.5991449 | −1.1197329 | −4.2994796 | 1.5514539 |

TABLE 7-continued

|  |  |  | E-5 | E-8 | E-13 | E-15 |
|---|---|---|---|---|---|---|
|  | $S_{19}$ |  | −0.0562715 | −4.3444998 | −8.5461416 | 8.6222297 | −5.1534467 |
|  |  |  | E-6 | E-9 | E-12 | E-15 |
| 11$^{th}$ Lens | $S_{80}$ |  | −10.399747 | −3.2567827 | 5.7686535 | −6.6283506 | 5.4352627 |
|  |  |  | E-5 | E-8 | E-11 | E-14 |
|  | $S_{21}$ |  | — | — | — | — | — |

Fno = 1.29
Lens Length = 159.14 (mm)
Field Angle 2 θ = 88.7 (degree)

TABLE 8

| Lens | Surface No. | Curvature Radius (mm) | Distance between Surfaces (mm) | Refractive Index (545 nm)/ Abbe's No. (vd) |
|---|---|---|---|---|
| Screen |  | ∞ | 580.0 | 1.0 |
| 1$^{st}$ Lens | $S_1$ | −154.96 | 4.55 | 1.49345/58 |
|  | $S_2$ | −70.000 | 10.500 | 1.0 |
| 2$^{nd}$ Lens | $S_3$ | −68.790 | 3.00 | 1.51877/64.2 |
|  | $S_4$ | −25.00 | 22.6 | 1.0 |
| 3$^{rd}$ Lens | $S_5$ | −28.982 | 3.00 | 1.51877/64.2 |
|  | $S_6$ | −20.961 | 15.302 | 1.0 |
| 4$^{th}$ Lens | $S_7$ | 62.128 | 3.00 | 1.51877/64.2 |
|  | $S_8$ | −320.69 | 1.9000 | 1.0 |
| 5$^{th}$ Lens | $S_9$ | −43.112 | 6.200 | 1.85530/23.8 |
|  | $S_{10}$ | 135.0 | 6.723 | 1.0 |
| 6$^{th}$ Lens | $S_{11}$ | −350.00 | 5.4 | 1.83945/37.3 |
|  | $S_{12}$ | 50.732 | 6.4161 | 1.0 |
| 7$^{th}$ Lens | $S_{13}$ | 27.50 | 3.0 | 1.85530/23.8 |
| 8$^{th}$ Lens | $S_{14}$ | −31.0 | 17.0 | 1.69988/55.5 |
|  | $S_{15}$ | 40.570 | 4.8381 | 1.0 |
| 9$^{th}$ Lens | $S_{16}$ | −43.851 | 17.5 | 1.62293/60.3 |
|  | $S_{17}$ | 175.0 | 6.9398 | 1.0 |
| 10$^{th}$ Lens | $S_{18}$ | −420.82 | 8.7 | 1.49345/58 |
|  | $S_{19}$ | 39.0 | 9.0698 | 1.0 |
| 11$^{th}$ Lens | $S_{20}$ | 49.0 | 3.3 | 1.49345/58 |
|  | $S_{21}$ | −210.0 |  |  |
| Cooling Liqid | $S_{22}$ | ∞ | 12.60 | 1.44712 |
| Panel | $S_{23}$ | ∞ | 1.1 | 1.53994 |

(Aspherical Surface Data)

| Lens Surface | Surface No. | CC | AE | AF | AG | AH |
|---|---|---|---|---|---|---|
| 1$^{st}$ Lens | $S_1$ | 13.073359 | −8.4122912 | 3.7290420 | −1.557032 | 2.5313516 |
|  |  |  | E-6 | E-9 | E-12 | E-16 |
|  | $S_2$ | 1.8908005 | −7.5619955 | 1.5145989 | 1.8010532 | −3.8327140 |
|  |  |  | E-6 | E-9 | E-12 | E-16 |
| 10$^{th}$ Lens | $S_{18}$ | −342.69482 | 1.572138 | −1.3305602 | −5.9943478 | 2.8583089 |
|  |  |  | E-5 | E-8 | E-14 | E-15 |
|  | $S_{19}$ | 0.01684093 | −1.0722081 | −3.6147234 | 5.1139067 | −4.6122672 |
|  |  |  | E-5 | E-9 | E-12 | E-15 |
| 11$^{th}$ Lens | $S_{80}$ | −25.722656 | −2.9601753 | 4.8327767 | −5.6930335 | 4.6567872 |
|  |  |  | E-5 | E-8 | E-11 | E-14 |
|  | $S_{21}$ | — | — | — | — | — |

Fno = 1.38
Lens Length = 171.99 (mm)
Field Angle 2 θ = 94.7 (degree)

TABLE 9

| Lens | Surface No. | Curvature Radius (mm) | Distance between Surfaces (mm) | Refractive Index (545 nm)/ Abbe's No. (vd) |
|---|---|---|---|---|
| Screen |  | ∞ | 650.0 | 1.0 |
| 1$^{st}$ Lens | $S_1$ | −147.96 | 4.55 | 1.49345/58 |
|  | $S_2$ | −74.561 | 13.427 | 1.0 |
| 2$^{nd}$ Lens | $S_3$ | −61.252 | 3.00 | 1.51877/64.2 |
|  | $S_4$ | −25.860 | 9.00 | 1.0 |
| 3$^{rd}$ Lens | $S_5$ | −37.893 | 3.00 | 1.51877/64.2 |
|  | $S_6$ | −20.500 | 14.604 | 1.0 |
| 4$^{th}$ Lens | $S_7$ | 82.0 | 2.70 | 1.51877/64.2 |

TABLE 9-continued

| Lens | Surface No. | Curvature Radius (mm) | Distance between Surfaces (mm) | Refractive Index (545 nm)/Abbe's No. (vd) |
|---|---|---|---|---|
| | $S_8$ | −500.0 | 0.99065 | 1.0 |
| 5th Lens | $S_9$ | −42.858 | 5.700 | 1.85530/23.8 |
| | $S_{10}$ | 1000.0 | 0.18021 | 1.0 |
| 6th Lens | $S_{11}$ | −2334.30 | 4.9 | 1.83945/37.3 |
| | $S_{12}$ | 49.0 | 9.2642 | 1.0 |
| 7th Lens | $S_{13}$ | 27.05 | 3.0 | 1.85530/23.8 |
| 8th Lens | $S_{14}$ | −30.5 | 18.0 | 1.69988/55.5 |
| | $S_{15}$ | 39.265 | 6.1262 | 1.0 |
| 9th Lens | $S_{16}$ | −47.939 | 17.5 | 1.62293/60.3 |
| | $S_{17}$ | 100.0 | 8.5928 | 1.0 |
| 10th Lens | $S_{18}$ | −250.0 | 8.7 | 1.49345/58 |
| | $S_{19}$ | 39.0 | 9.7711 | 1.0 |
| 11th Lens | $S_{20}$ | 47.5 | 3.3 | 1.49345/58 |
| | $S_{21}$ | −210.0 | | |
| Cooling Liqid | $S_{22}$ | ∞ | 3.24 | 1.44712 |
| Polarization Plate | $S_{23}$ | ∞ | 0.9 | 1.51873 |
| Cooling Liqid | $S_{24}$ | ∞ | 5.5 | 1.44712 |
| Panel | $S_{25}$ | ∞ | 4.1 | 1.46624 |

(Aspherical Surface Data)

| Lens Surface | Surface No. | CC | AE | AF | AG | AH |
|---|---|---|---|---|---|---|
| 1st Lens | $S_1$ | 14.993329 | −9.1332795 E-6 | 6.1285022 E-9 | −2.9681535 E-12 | 2.8040136 E-16 |
| | $S_2$ | 4.6389408 | −8.7577673 E-6 | 6.8826687 E-9 | −2.4833651 E-12 | −1.5190120 E-16 |
| 10th Lens | $S_{18}$ | 96.816071 | 2.0327730 E-5 | −9.6633279 E-8 | −9.5667094 E-13 | 9.1837379 E-15 |
| | $S_{19}$ | 0.66361237 | −4.8277897 E-6 | −1.7351425 E-9 | 1.7273377 E-11 | −1.2118724 E-14 |
| 11th Lens | $S_{80}$ | 1.3448458 | −4.5566587 E-5 | 5.5138852 E-8 | −3.4320102 E-11 | 8.8926296 E-15 |
| | $S_{21}$ | — | — | — | — | — |

Fno = 1.39
Lens Length = 160.05 (mm)
Field Angle 2 θ = 88.7 (degree)

TABLE 10

| Lens | Surface No. | Curvature Radius (mm) | Distance between Surfaces (mm) | Refractive Index (545 nm)/Abbe's No. (vd) |
|---|---|---|---|---|
| Screen | | ∞ | 650.0 | 1.0 |
| 1st Lens | $S_1$ | −147.96 | 4.55 | 1.49345/58 |
| | $S_2$ | −77.045 | 13.427 | 1.0 |
| 2nd Lens | $S_3$ | −67.366 | 3.00 | 1.51877/64.2 |
| | $S_4$ | −25.860 | 9.00 | 1.0 |
| 3rd Lens | $S_5$ | −38.558 | 3.00 | 1.51877/64.2 |
| | $S_6$ | −20.500 | 14.604 | 1.0 |
| 4th Lens | $S_7$ | 82.0 | 2.70 | 1.51877/64.2 |
| | $S_8$ | −500.0 | 0.80331 | 1.0 |
| 5th Lens | $S_9$ | −42.628 | 5.700 | 1.85530/23.8 |
| | $S_{10}$ | 1000.0 | 0.8744 | 1.0 |
| 6th Lens | $S_{11}$ | −2334.3 | 4.9 | 1.83945/37.3 |
| | $S_{12}$ | 49.0 | 9.0752 | 1.0 |
| 7th Lens | $S_{13}$ | 27.05 | 3.0 | 1.85530/23.8 |
| 8th Lens | $S_{14}$ | −30.5 | 18.0 | 1.69988/55.5 |
| | $S_{15}$ | 38.38 | 5.7685 | 1.0 |
| 9th Lens | $S_{16}$ | −48.639 | 17.5 | 1.62293/60.3 |
| | $S_{17}$ | 103.32 | 9.8488 | 1.0 |
| 10th Lens | $S_{18}$ | −502.17 | 8.7 | 1.49345/58 |
| | $S_{19}$ | 39.0 | 9.7504 | 1.0 |
| 11th Lens | $S_{20}$ | 58.498 | 3.3 | 1.49345/58 |
| | $S_{21}$ | −210.0 | | |
| Cooling Liqid | $S_{22}$ | ∞ | 3.24 | 1.44712 |
| Polarization Plate | $S_{23}$ | ∞ | 0.9 | 1.51873 |
| Cooling Liqid | $S_{24}$ | ∞ | 5.5 | 1.44712 |
| Panel | $S_{25}$ | ∞ | 4.1 | 1.46624 |

TABLE 10-continued (Aspherical Surface Data)

| Lens Surface | Surface No. | CC | AE | AF | AG | AH |
|---|---|---|---|---|---|---|
| 1st Lens | $S_1$ | 13.473834 | -8.8550696 E-6 | 5.7664913 E-9 | -2.9296661 E-12 | 7.8309191 E-16 |
| | $S_2$ | 4.2982702 | -8.1290164 E-6 | 5.3926748 E-9 | -9.480099 E-13 | 3.0769234 E-16 |
| 10th Lens | $S_{18}$ | -477.90820 | 2.0262712 E-5 | -1.0108995 E-8 | -9.7495111 E-12 | 8.7215662 E-15 |
| | $S_{19}$ | 0.64989954 | -5.5940936 E-6 | -1.5675433 E-8 | 1.7502264 E-11 | -1.4562672 E-14 |
| 11th Lens | $S_{80}$ | 2.4816351 | -4.3202701 E-5 | 5.4082587 E-8 | -3.5894315 E-11 | 1.2801643 E-14 |
| | $S_{21}$ | — | — | — | — | — |

Fno = 1.41
Lens Length = 160.24 (mm)
Field Angle $2\theta$ = 88.7 (degree)

TABLE 11

| Lens | Surface No. | Curvature Radius (mm) | Distance between Surfaces (mm) | Refractive Index (545 nm)/ Abbe's No. (vd) |
|---|---|---|---|---|
| Screen | | ∞ | 650.0 | 1.0 |
| 1st Lens | $S_1$ | -62.736 | 4.55 | 1.49345/58 |
| | $S_2$ | -39.000 | 9.363 | 1.0 |
| 2nd Lens | $S_3$ | -75.000 | 3.00 | 1.51877/64.2 |
| | $S_4$ | -25.860 | 7.60 | 1.0 |
| 3rd Lens | $S_5$ | -36.316 | 3.00 | 1.51877/64.2 |
| | $S_6$ | -20.500 | 12.884 | 1.0 |
| 4th Lens | $S_7$ | 94.360 | 2.70 | 1.51877/64.2 |
| | $S_8$ | -313.81 | 0.1961 | 1.0 |
| 5th Lens | $S_9$ | -42.900 | 5.700 | 1.85530/23.8 |
| | $S_{10}$ | 486.55 | 2.400 | 1.0 |
| 6th Lens | $S_{11}$ | 289.33 | 4.9 | 1.83945/37.3 |
| | $S_{12}$ | 41.347 | 8.422 | 1.0 |
| 7th Lens | $S_{13}$ | 25.60 | 3.0 | 1.85530/23.8 |
| 8th Lens | $S_{14}$ | -31.0 | 18.0 | 1.69988/55.5 |
| | $S_{15}$ | 34.9 | 10.00 | 1.0 |
| 9th Lens | $S_{16}$ | -53.219 | 17.5 | 1.62293/60.3 |
| | $S_{17}$ | 89.5 | 12.553 | 1.0 |
| 10th Lens | $S_{18}$ | -290.0 | 5.7 | 1.49345/58 |
| | $S_{19}$ | 42.5 | 6.800 | 1.0 |
| 11th Lens | $S_{20}$ | 70.0 | 3.3 | 1.49345/58 |
| | $S_{21}$ | -250.0 | | |
| Cooling Liqid | $S_{22}$ | ∞ | 6.50 | 1.44712 |
| Polarization Plate | $S_{23}$ | ∞ | 0.9 | 1.51877 |
| Cooling Liqid | $S_{24}$ | ∞ | 6.7 | 1.44712 |
| Panel | $S_{25}$ | ∞ | 4.1 | 1.46624 |

(Aspherical Surface Data)

| Lens Surface | Surface No. | CC | AE | AF | AG | AH |
|---|---|---|---|---|---|---|
| 1st Lens | $S_1$ | 0.00 | -6.922849 E-6 | -1.1360889 E-8 | 2.4360416 E-11 | -1.5231357 E-14 |
| | $S_2$ | 1.30 | -2.959755 E-6 | -2.8846578 E-8 | 7.948056 E-11 | -5.192401 E-14 |
| 10th Lens | $S_{18}$ | 0.00 | 1.521702 E-5 | -3.144443 E-8 | 7.399224 E-11 | -4.562931 E-14 |
| | $S_{19}$ | 0.00 | -2.093929 E-5 | 7.243783 E-10 | 5.439728 E-11 | -3.890329 E-14 |
| 11th Lens | $S_{80}$ | 0.00 | -5.127867 E-5 | 1.076251 E-7 | -1.392741 E-10 | 9.944736 E-14 |
| | $S_{21}$ | — | — | — | — | — |

Fno = 1.47
Lens Length = 160.24 (mm)
Field Angle $2\theta$ = 88.7 (degree)

TABLE 12

| Lens | Surface No. | Curvature Radius (mm) | Distance between Surfaces (mm) | Refractive Index (545 nm)/ Abbe's No. (vd) |
|---|---|---|---|---|
| Screen | | ∞ | 650.0 | 1.0 |
| 1st Lens | $S_1$ | −71.369 | 4.55 | 1.49345/58 |
| | $S_2$ | −39.262 | 12.589 | 1.0 |
| 2nd Lens | $S_3$ | −75.000 | 3.00 | 1.51877/64.2 |
| | $S_4$ | −25.860 | 7.447 | 1.0 |
| 3rd Lens | $S_5$ | −36.316 | 3.00 | 1.51877/64.2 |
| | $S_6$ | −20.500 | 11.155 | 1.0 |
| 4th Lens | $S_7$ | 99.227 | 2.70 | 1.51877/64.2 |
| | $S_8$ | −392.03 | 0.1949 | 1.0 |
| 5th Lens | $S_9$ | −42.900 | 5.700 | 1.85530/23.8 |
| | $S_{10}$ | 486.55 | 3.300 | 1.0 |
| 6th Lens | $S_{11}$ | 286.27 | 4.9 | 1.83945/37.3 |
| | $S_{12}$ | 39.499 | 8.422 | 1.0 |
| 7th Lens | $S_{13}$ | 25.60 | 3.0 | 1.85530/23.8 |
| 8th Lens | $S_{14}$ | −31.0 | 18.5 | 1.69988/55.5 |
| | $S_{15}$ | 34.9 | 10.200 | 1.0 |
| 9th Lens | $S_{16}$ | −56.144 | 17.5 | 1.62293/60.3 |
| | $S_{17}$ | 89.5 | 12.553 | 1.0 |
| 10th Lens | $S_{18}$ | −240.0 | 5.7 | 1.49345/58 |
| | $S_{19}$ | 42.5 | 6.800 | 1.0 |
| 11th Lens | $S_{20}$ | 70.0 | 3.3 | 1.49345/58 |
| | $S_{21}$ | −500.0 | | |
| Cooling Liqid | $S_{22}$ | ∞ | 6.50 | 1.44712 |
| Polarization Plate | $S_{23}$ | ∞ | 0.9 | 1.51877 |
| Cooling Liqid | $S_{24}$ | ∞ | 6.7 | 1.44712 |
| Panel | $S_{25}$ | ∞ | 4.1 | 1.46624 |

(Aspherical Surface Data)

| Lens Surface | Surface No. | CC | AE | AF | AG | AH |
|---|---|---|---|---|---|---|
| 1st Lens | $S_1$ | 0.0000 | −6.2879517 E-6 | −8.7639087 E-9 | 2.2719882 E-11 | −1.4269029 E-14 |
| | $S_2$ | 1.3000 | −1.6894583 E-6 | −2.9198524 E-8 | 8.5027443 E-11 | −5.7101296 E-14 |
| 10th Lens | $S_{18}$ | 0.0000 | 1.5585945 E-5 | −3.1659045 E-8 | 7.1145922 E-11 | −4.4500651 E-14 |
| | $S_{19}$ | 0.0000 | −1.7234284 E-5 | −9.665686 E-10 | 5.0980983 E-11 | −3.7221772 E-14 |
| 11th Lens | $S_{80}$ | 0.0000 | −4.4669563 E-5 | 9.5786334 E-8 | −1.2278345 E-10 | 9.0550289 E-14 |
| | $S_{21}$ | — | — | — | — | — |

Fno = 1.50
Lens Length = 162.71 (mm)
Field Angle 2 θ = 88.7 (degree)

TABLE 13

| Lens | Surface No. | Curvature Radius (mm) | Distance between Surfaces (mm) | Refractive Index (545 nm)/ Abbe's No. (vd) |
|---|---|---|---|---|
| Screen | | ∞ | 650.0 | 1.0 |
| 1st Lens | $S_1$ | −66.415 | 4.55 | 1.49345/58 |
| | $S_2$ | −38.000 | 11.140 | 1.0 |
| 2nd Lens | $S_3$ | −75.000 | 3.00 | 1.51877/64.2 |
| | $S_4$ | −25.840 | 6.15 | 1.0 |
| 3rd Lens | $S_5$ | −36.210 | 3.00 | 1.51877/64.2 |
| | $S_6$ | −20.500 | 11.510 | 1.0 |
| 4th Lens | $S_7$ | 88.188 | 2.70 | 1.51877/64.2 |
| | $S_8$ | −3000.0 | 0.160 | 1.0 |
| 5th Lens | $S_9$ | −42.910 | 5.700 | 1.85530/23.8 |
| | $S_{10}$ | 483.0 | 3.300 | 1.0 |
| 6th Lens | $S_{11}$ | 284.78 | 3.50 | 1.83945/37.3 |
| | $S_{12}$ | 40.35 | 8.42 | 1.0 |
| 7th Lens | $S_{13}$ | 25.614 | 3.0 | 1.85530/23.8 |
| 8th Lens | $S_{14}$ | −31.07 | 18.5 | 1.69988/55.5 |
| | $S_{15}$ | 34.944 | 10.00 | 1.0 |
| 9th Lens | $S_{16}$ | −52.480 | 18.0 | 1.62293/60.3 |
| | $S_{17}$ | 95.0 | 10.8 | 1.0 |

TABLE 13-continued

| Lens | Surface | | | | |
|---|---|---|---|---|---|
| 10th Lens | $S_{18}$ | −234.02 | 5.7 | 1.49345/58 | |
| | $S_{19}$ | 41.086 | 6.86 | 1.0 | |
| 11th Lens | $S_{20}$ | 70.0 | 3.3 | 1.49345/58 | |
| | $S_{21}$ | −500.0 | | | |
| Cooling Liqid | $S_{22}$ | ∞ | 6.50 | 1.44712 | |
| Polarization Plate | $S_{23}$ | ∞ | 1.6 | 1.51877 | |
| Cooling Liqid | $S_{24}$ | ∞ | 6.0 | 1.44712 | |
| Panel | $S_{25}$ | ∞ | 4.1 | 1.46624 | |

(Aspherical Surface Data)

| Lens Surface | Surface No. | CC | AE | AF | AG | AH |
|---|---|---|---|---|---|---|
| 1st Lens | $S_1$ | −1.6575909 | −4.1854855 E-6 | −1.3889917 E-8 | 2.6624258 E-11 | −1.5851795 E-14 |
| | $S_2$ | 1.250000 | 1.8068249 E-6 | −3.2344776 E-8 | 8.1783483 E-11 | −5.0984780 E-14 |
| 10th Lens | $S_{18}$ | −174.76520 | 1.276181 E-5 | −2.8453741 E-8 | 6.6053801 E-11 | −4.0373500 E-14 |
| | $S_{19}$ | 0.3875325 | −1.9202213 E-5 | −5.6344049 E-9 | 5.5729268 E-11 | −3.8641890 E-14 |
| 11th Lens | $S_{80}$ | 3.5862026 | −4.6143614 E-5 | 9.1098741 E-8 | −1.1338692 E-10 | 8.2068196 E-14 |
| | $S_{21}$ | — | — | — | — | — |

Fno = 1.50
Lens Length = 157.49 (mm)
Field Angle 2 θ = 88.7 (degree)

Next, the way of reading those lens data will be explained in comparison with FIG. 5 on a basis of the Table 1. In the Table 1, there are described data divided into a spherical system, in which are mainly treated those of lens region in vicinity of the optical axis, and an aspherical system, in which are mainly treated those of periphery thereof. It is indicated that, first of all, the screen has the curvature radius of infinity ∞ (i.e., a plane), that the distance (distance between the surfaces) from the screen to the surface $S_1$ of the first lens unit $L_1$ of the first lens group is 650 mm, and that the refractive index of the medium between them is 1.0. Also, it is indicated that the curvature radius of the lens surface $S_1$ is −147.96 mm (it takes a positive sign when the curvature center is located in the screen side, therefore, in this case, it is located in the side of the liquid crystal panel), that the distance (distance between the surfaces) on the optical axis from the lens surface $S_1$ to the lens surface $S_2$ is 4.55 mm, and that the refractive index of the medium between them is 1.49345. Hereinafter, in the same manner as in the above, it is indicated that, lastly, the curvature radius of the surface $S_{25}$ on which is formed TFT of the liquid crystal panel is infinity ∞ (i.e., the plane), that the thickness of the panel is 4.1 mm, and that the refractive index is 1.46624.

With the lens surfaces $S_1$ and $S_2$ of the first lens group $G_1$, the lens surfaces $S_{18}$, $S_{19}$ of the second lens group $G_2$, and the lens surfaces $S_{20}$ of the third lens group $G_3$, coefficients of those aspherical surfaces are also indicated.

The coefficient of the aspherical surface is, here, a one when the shape of the lens is expressed by the following equation:

$$z(r) = \frac{(r^2/RD)}{1+\sqrt{1-(1+CC)r^2/RD^2}} +$$

-continued
$$AE \cdot r^4 + AF \cdot r^6 + AG \cdot r^8 + AH \cdot r^{10} + \cdots + A \cdot r^{2n}$$

where, RD, CC, AE, AF, AG, AH . . . A are arbitrary constants and n is an arbitrary natural number.

Figure 14:
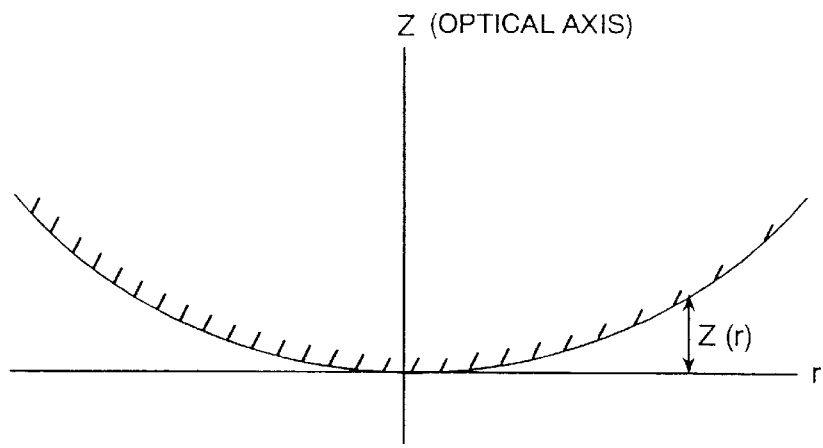
FIG. 14 is an explanatory view for use in an explanation of definition in a shape of the lens.

However, the function Z(r) represents, as can be seen from FIG. 14 of explaining the definition of the lens shape, height of the lens surface when taking an optical axis from the image source to the screen as a Z axis and the radius of the lens as an r axis. Here, r indicates the distance in radius direction and RD the curvature radius. Consequently, if every coefficient of those CC, AE, AF, AG, AH is given, then the height of the lens surface, i.e., the lens shape is determined according to the above equation.

The above-mentioned is the way of reading the data shown in the Table 1. Other Tables 2 to 10 indicate the data corresponding to the other embodiments.

Next, operations of each lens group of the projection lens device according to the present invention will be explained. As shown in FIGS. 7 to 11, it is so constructed that the first lens group has a negative refractive power, the second group a positive refractive power, and the third group a negative refractive power.

Therefore, with the embodiment of the present invention, since a flat picture can be obtained with a wide field angle of nearly equal to 90 degree, it is possible to obtain preferable focus quality even at every corner of the screen. Further, since at the both sides of the second lens group of the positive power are positioned the first and the third lens groups of the negative power, symmetrically, it is advantageous for reduction in the distortion from view point of the construction. With the embodiments of the present invention, the distortion is decreased less than 1%.

$P_0$ shown in FIGS. 7 to 11 indicates an object point on the optical axis 11', and $P_1$ an object point at the most peripheral portion of the screen. Among the light flux from the object point $P_0$ on the optical axis, an upper limit ray which forms the image on the screen is depicted by RAY1, and a lower limit ray by RAY2, therein. Further, among the light flux from the object point $P_1$ at the most periphery of the screen, an upper limit ray which forms the image on the screen is depicted by RAY3, a lower limit ray by RAY5, and a principal ray by RAY4, therein.

In the projection lens device according to the present invention, each of the first lens element $L_1$, the second lens element $L_2$ and the third lens element $L_3$, which forms the first lens group, is constructed by a meniscus lens which has a convex surface toward the screen side and negative power, thereby compensating the curvature of field while suppressing the aberration generated. In particular, the first lens element $L_1$, through which the light flux from the object point $P_0$ on the axis and the light flux from the object point $P_1$ at the most periphery pass at the totally different portions thereof, is formed as an aspherical lens made of plastic material, thereby compensating the aberration, including coma and astigmatism, with high accuracy, hardly giving effect on the aberration occurring on the optical axis. Further, the plastic lens is so designed that it has a thickness as uniform as possible, thereby reducing the fluctuation in the refractive power due to the changes in the refractive index and the shape caused by change of the temperature or the hygroscopic swelling. Further, the fourth lens element $L_4$, which is provided at a position where the light flux from the object point $P_0$ on the axis is widen at the most, carries the compensation of spherical aberration as well as a part of the compensation of the coma.

The second lens group carries the all of the positive refractive power as an entire system. Among those, the fifth lens element $L_5$ is made of a high dispersion material having the Abbe's number of 23.8 and has a positive refractive power, and also the sixth lens element $L_6$ is made of a high dispersion material having the Abbe's number of 37.3 and has a positive refractive power. Those lenses, both of which are made of high refractive material having values more than 1.8 in refractive index, carry the most of the positive refractive power, and in addition thereto, they satisfy achromatic condition and also control the height of the light beam which is incident upon the first lens group, thereby reducing chromatic aberration of magnification.

The seventh lens element $L_7$ is made of a high dispersion material having the Abbe's number of 23.8, and the eight lens element $L_7$ is made of a low dispersion material having the Abbe's number of 55.5, thereby reducing the chromatic aberration on the optical axis.

The ninth lens element $L_9$ is a double-convex lens element made of a low dispersion material having the Abbe's number of 60.3, and it carries a part of the positive refractive power as the entire system.

The tenth lens element $L_{10}$ is a plastic-made lens element, and it carries a part of the positive refractive power as the entire system, and since the light flux from the object point $P_0$ on the axis and the light flux from the object point $P_1$ at the most periphery pass through it at the totally different portions thereof, as in the same manner of the first lens element $L_1$, the lens surfaces $S_{18}$ and $S_{19}$ are made aspherical in the shape of those surfaces. Thereby, not only the compensation of the aberration on the axis and the aberrations such as the coma, but also the compensation of the astigmatism of high dimension occurring outside the optical axis are established.

The eleventh lens element $L_{11}$ of the third lens group is also a plastic-made lens element, and it has the lens surface $S_{20}$ of the aspherical surface so that it has the negative refractive power in the vicinity of the optical axis and has the positive refractive power at the periphery thereof. In the embodiment of the present invention, the cooling liquid of 1.44712 in the refractive index is filled between the liquid crystal panel and the eleventh lens element $L_{11}$, thereby cooling the liquid crystal panel, the polarization panel and so on, as well as reducing loss due to the reflection of the image light so as to obtaining a picture of high contrast. The refractive power of the third lens group G3 is calculated for estimation, including the cooling liquid, the liquid crystal panel and the polarization panel mentioned in the above.

In accordance with the present invention, the eleventh lens element $L_{11}$ and the tenth lens element $L_{10}$ are so constructed that the local shapes of those aspherical lenses cancel each other the fluctuations in the refractive power due to the change of the temperature and the humidity. Hereinafter, this technology will be explained in detail.

Figure 12:
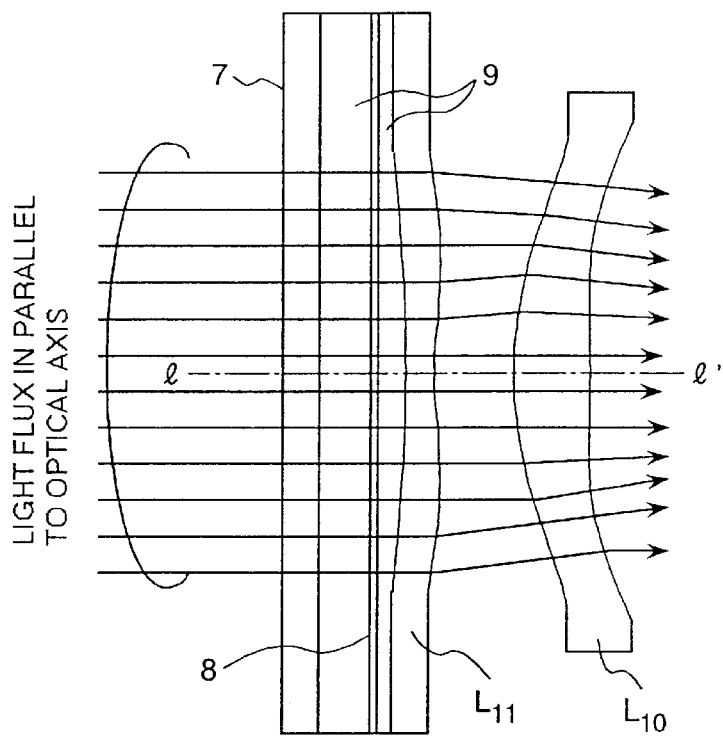
FIG. 12 is an explanatory view of function of a part of the lens elements in the projection lens device according to the present invention.
Figure 13:
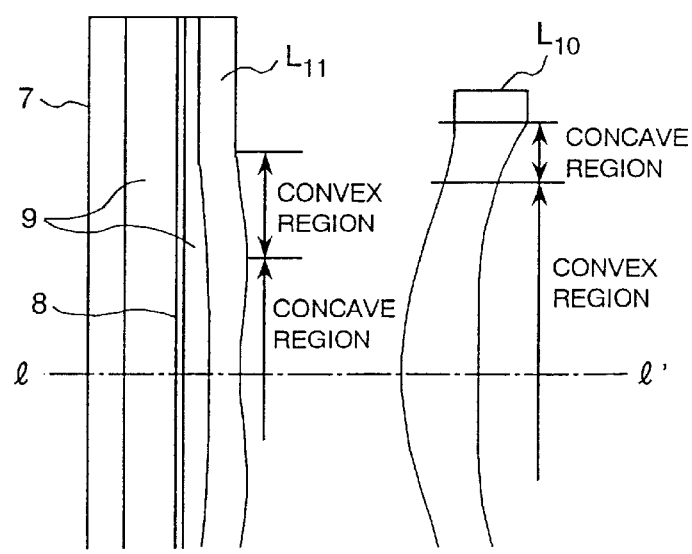
FIG. 13 is also an explanatory view of function of a portion of the lens elements in the projection lens device according to the present invention.

FIG. 12 shows the tracks of the light beam when a light flux is incident in parallel to the optical axis 1 and 1' upon the eleventh lens element $L_{11}$ and the tenth lens element $L_{10}$ in the first embodiment of the present invention. In the vicinity of the optical axis 1 and 1' of the eleventh lens element $L_{11}$, there is diverging (of a concave lens) function, while in the periphery thereof a condensing (of a convex lens) function. On the other hand, in the vicinity of the optical axis 1 and 1' of the tenth lens element $L_{10}$, there is the condensing function, while on the contrary to this, there is the diverging (of the concave lens) function in the periphery thereof. FIG. 13 shows those of the respective lenses, being divided by the regions thereof. Namely, as shown in FIGS. 7 to 11, with the plastic aspherical lenses of the eleventh lens element and the tenth lens element, there are the diverging (of the concave lens) function by the eleventh lens element $L_{11}$ and the condensing (of the convex lens) function by the tenth lens element $L_{10}$, in the vicinity of the optical axis where the light flux from the object point $P_0$ on the axis passes through. On the other hand, in the periphery thereof where the light flux from the object point $P_1$ at the most peripheral portion of the liquid crystal panel passes through, on the contrary to the above, there is the condensing (of the convex lens) function by the eleventh lens element $L_{11}$, while the diverging (of the concave lens) function by the tenth lens element $L_{10}$.

With this, if the refractive power is fluctuated due to the change in the shape and the refractive index which are caused by change of the temperature or the hygroscopic swelling, it is canceled to each other, thereby dissolving problems, such as the change in the focus position and/or the decrease in the focus quality.

In the projection lens device of the present invention, since the light flux from the object point $P_0$ on the axis and the light flux from the object point $P_1$ at the most peripheral portion of the liquid crystal plate pass through the portions which are totally different from each other, in the first lens element $L_1$, the tenth lens element $L_{10}$ and the eleventh lens element $L_{11}$, those lens elements are shaped aspherical on the surfaces thereof, thereby achieving both the compensation of the aberration on the axis and the aberrations such as the coma and the astigmatism.

Figure 15:
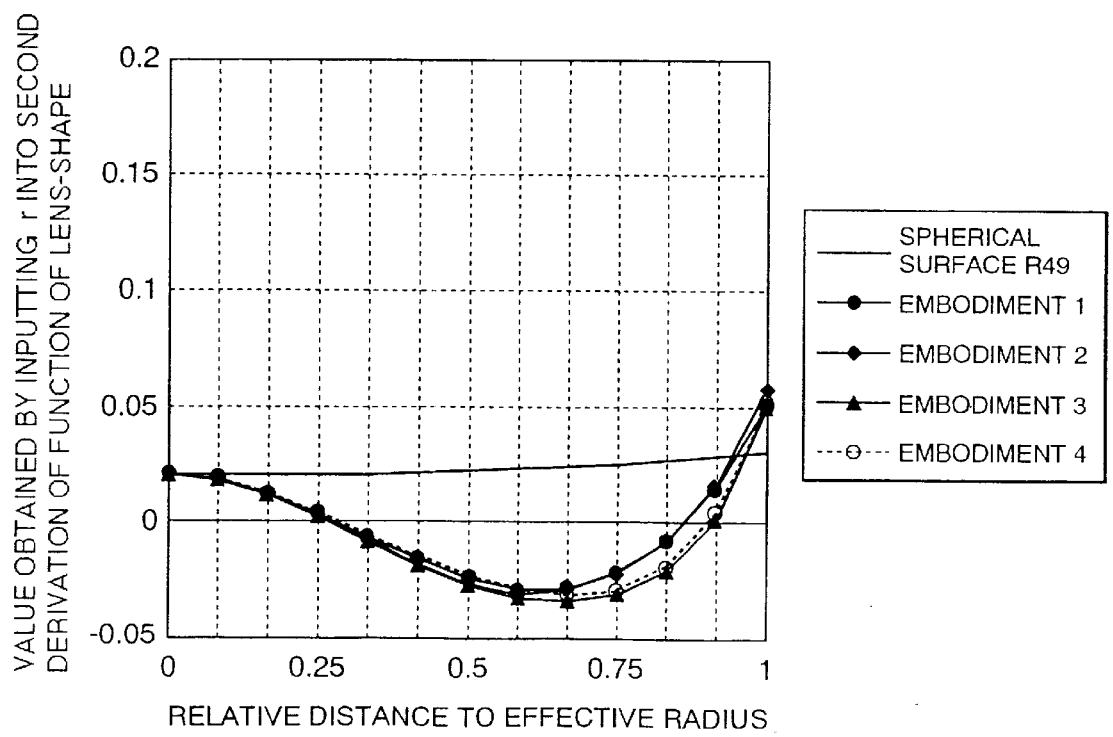
FIG. 15 shows characteristic curves for indicating feature of a portion of the lens elements in the projection lens device according to the present invention.
Figure 16:
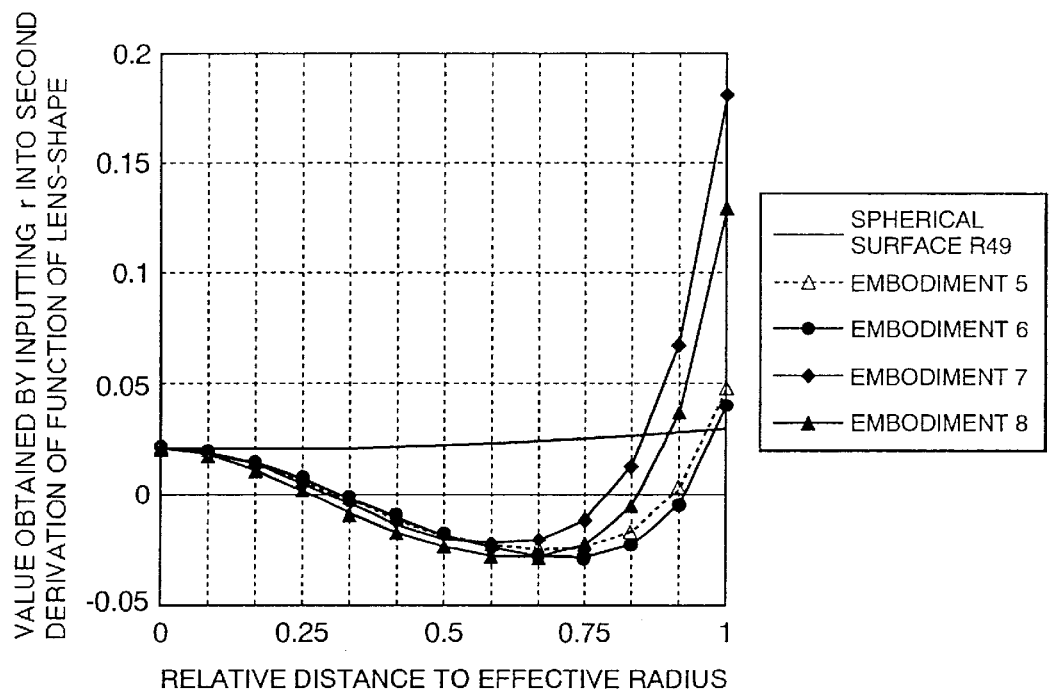
FIG. 16 also shows characteristic curves for indicating feature of a portion of the lens elements in the projection lens device according to the present invention.
Figure 17:
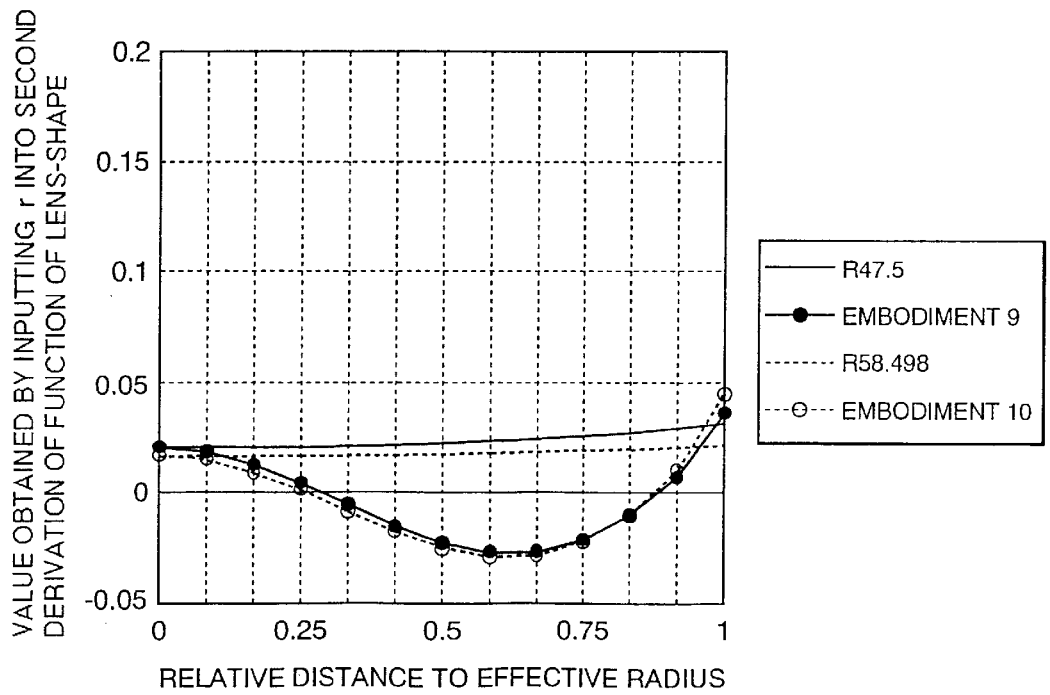
FIG. 17 also shows characteristic curves for indicating feature of a portion of the lens elements in the projection lens device according to the present invention.

FIGS. 15 to 17 show the values in graphs, which are obtained by putting the distance r from the optical axis into a function being obtained as a second derivation of a function which represents the aspherical surface of the lens surface of the eleventh lens element $L_{11}$ at the screen side thereof, for the embodiments 1 to 10 of the present invention. In each of them, a solid line indicates the value when the lens surface is made spherical, the other indicates that when coefficient of the aspherical surface is taken into a consideration. With the spherical lens (in case where, in the embodiments 1 to 8, the radius is 49 mm, in the embodiment 9, the radius is 47.5 mm, and in the embodiment 10, the radius is 58.498 mm), the values obtained by inputting the above-mentioned distance r from the optical axis are almost a constant value, namely it indicates that the diverging function does not vary. On the contrary to this, when the aspherical surface is taken into a consideration, a lens shape can be obtained, which has an inflection point around 25% of the effective radius of the lens, and it is apparent that, in the lens function, the diverging function is strong in the vicinity of the optical axis and is gradually weakened toward the periphery and the condensing function comes to be the strongest from 60% to 70% of the effective lens length.

Figure 18:
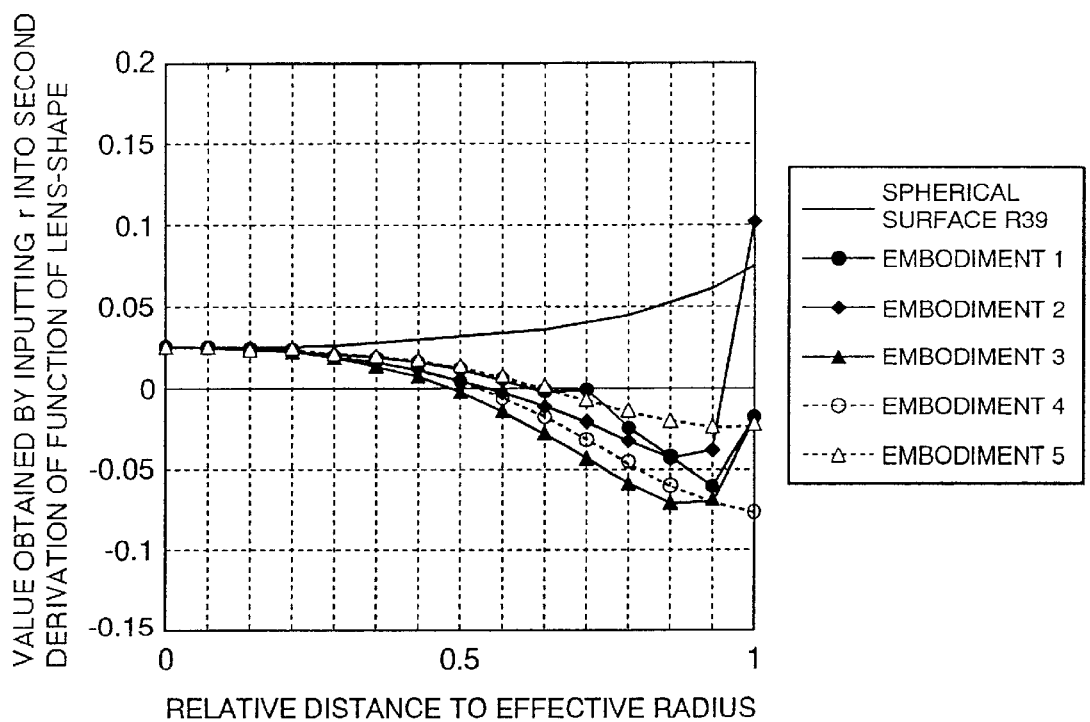
FIG. 18 also shows characteristic curves for indicating feature of a portion of the lens elements in the projection lens device according to the present invention.
Figure 19:
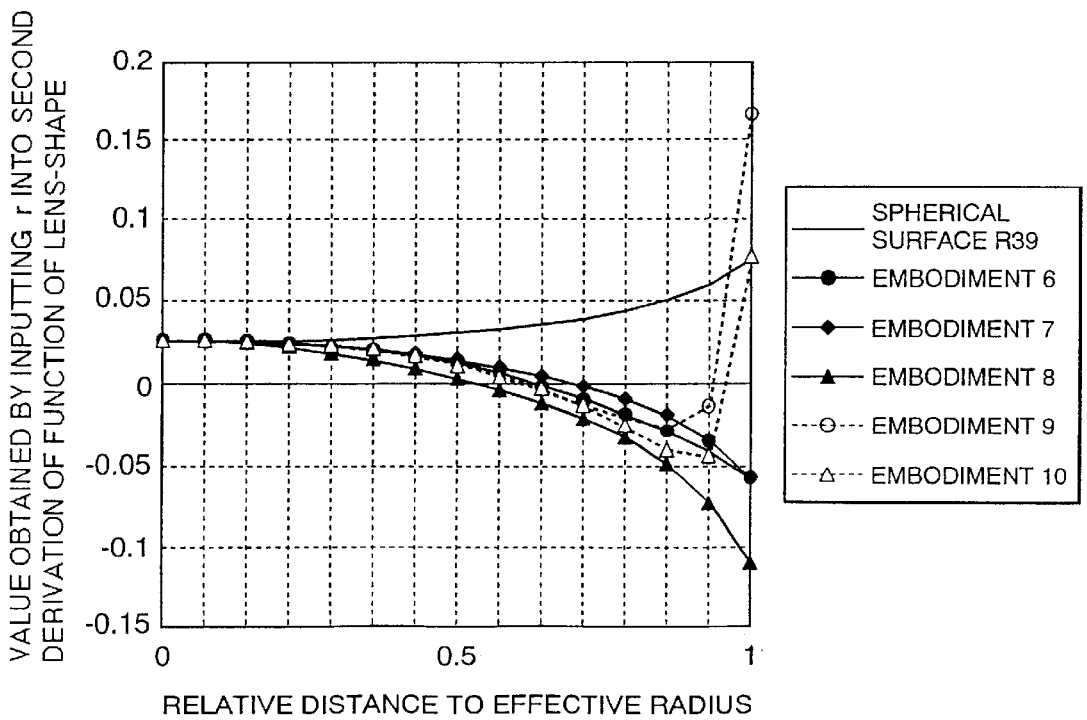
FIG. 19 also shows characteristic curves for indicating feature of a portion of the lens elements in the projection lens device according to the present invention.

In the same manner, FIGS. 18 and 19 show the values in graphs, which are obtained by putting the distance r from the optical axis into the function being obtained as the second derivation of a function which represents the aspherical surface of the lens surface of the tenth lens element $L_{10}$ at the liquid crystal panel side thereof, for the embodiments 1 to 10 of the present invention. In each of them, a solid line indicates the value when the lens surface is made spherical (with radius of 39 mm), the other indicates that when coefficient of the aspherical surface is taken into a consideration. Apparently, in case where it is shaped as the spherical lens, the values obtained by inputting the above-mentioned distance r from the optical axis increases gradually, namely it indicates that the condensing function does not change.

On the contrary to this, when the aspherical surface is taken into a consideration, a lens shape can be obtained, which has an inflection point around from 50% to 60% of the effective radius of the lens, and it is apparent that, in the lens function, the condensing function is strong in the vicinity of the optical axis and is gradually weakened toward the periphery and the diverging function comes to be the strongest from 80% to 100% of the effective lens length.

Further, as shown in FIGS. 7 to 11, since the shape of the eleventh lens $L_{11}$, through which the light flux from the object point $P_1$ at the most peripheral portion of the image (i.e., the liquid crystal panel) penetrates, is not such a simple one as a concave lens, but is aspherical surface having the condensing function (as of the convex lens) at periphery, therefore, the light flux does not spread, and the lenses positioned at the screen side following the tenth lens element $L_{10}$ can be reduced in the diameter thereof, thereby being advantageous for reduction of the cost.

Figure 20:
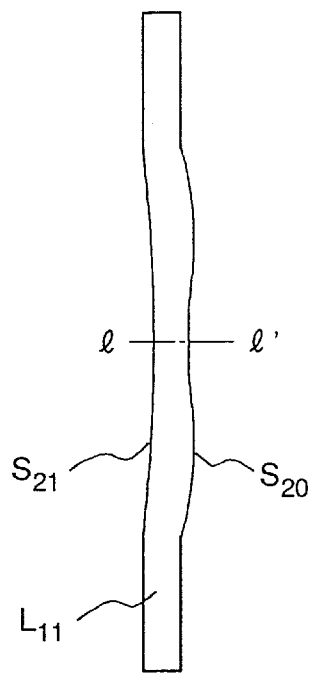
FIG. 20 shows a shape of a lens element in the projection lens device according to the present invention.
Figure 21:
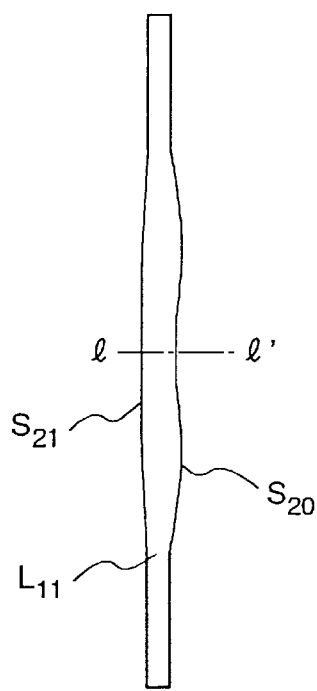
FIG. 21 also shows a shape of a lens element in the projection lens device according to the present invention.
Figure 22:
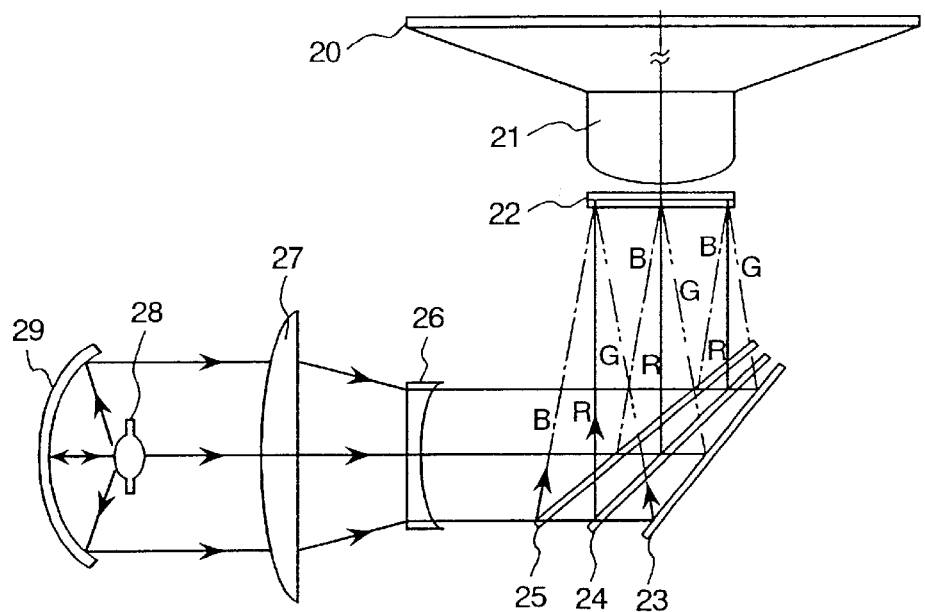
FIG. 22 is a cross section view of showing a general construction of an optical system of a projection display apparatus using a single liquid crystal plate.
Figure 23:
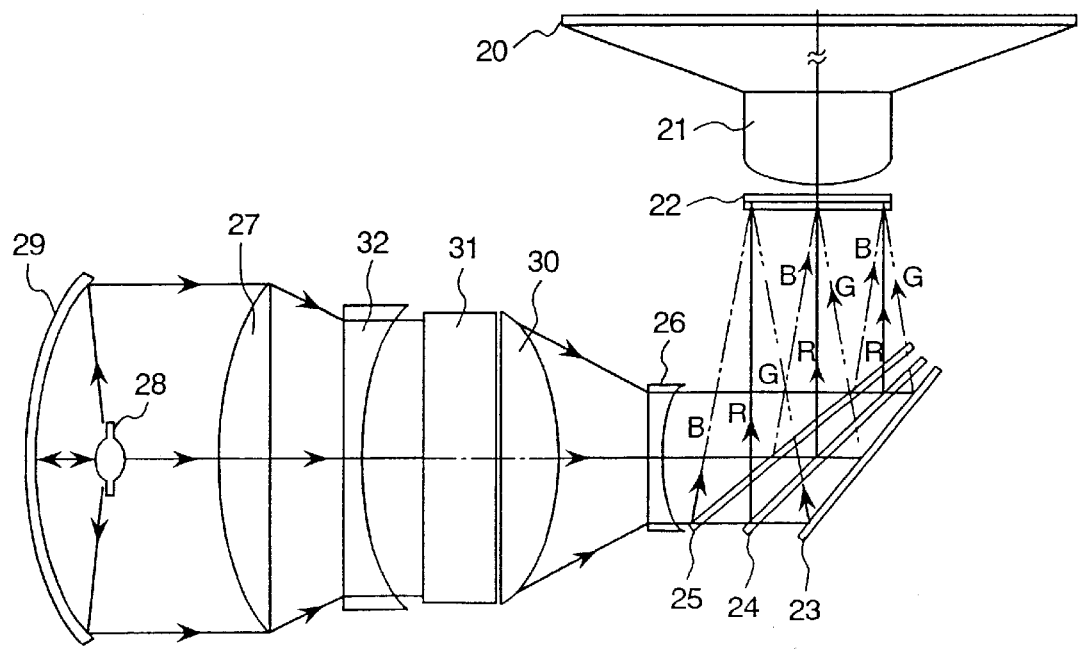
FIG. 23 is a cross section view of showing a general construction of an another optical system of a projection display apparatus using a single liquid crystal plate.

Next, possible shapes of the lens surface $S_{21}$ of the eleventh lens element $L_{11}$, which contacts with the cooling liquid will be explained by referring to FIGS. 20 and 21. 71 The lens surface $S_{21}$ of the eleventh lens element $L_{11}$ at the screen side is such the aspherical surface as mentioned in the above. While, if making the lens surface $S_{21}$ which contacts with the cooling liquid into the spherical shape, with which the curvature center exists at the screen side as is shown in FIG. 21, an edge portion of the lens becomes too thin in the thickness to obtain a desired shape thereof, since it obstructs flow of resin material during the molding thereof. On the contrary, if trying to ensure an enough thickness at the edge portion, the thickness of the lens increases at a center thereof, therefore, not only the amount of use of the resin material, but also the time-period for the molding increase up, and further production cost thereof also increases greatly. Therefore, if the lens surface $S_{21}$ which contacts with the cooling liquid is shaped in a plane or in a configure with which the curvature center is located a the side of the liquid crystal panel, it is possible to obtain a lens element which is more uniform in the thickness, i.e., the difference between the thickness at the edge portion and the central portion of the lens is small, thereby dissolving the problem in the molding mentioned in the above.

Next will be explained the result of evaluation on the focus quality by MTF (Modulation Transfer Function), in case where the image displayed on the single-plate liquid crystal panel of 1.6 inches is projected upon a screen of 50 inches by using the projection lens device according to the present invention mentioned in the above, by referring to FIGS. 24 to 33.

Figure 24:
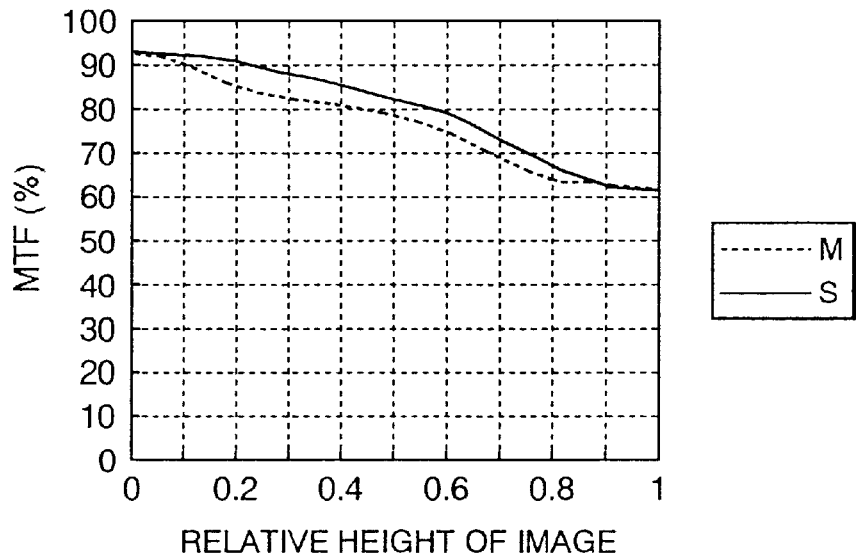
FIG. 24 shows a MTF characteristic curve for indicating focus quality of the projection lens device of the embodiment according to the present invention shown in Table 1.
Figure 25:
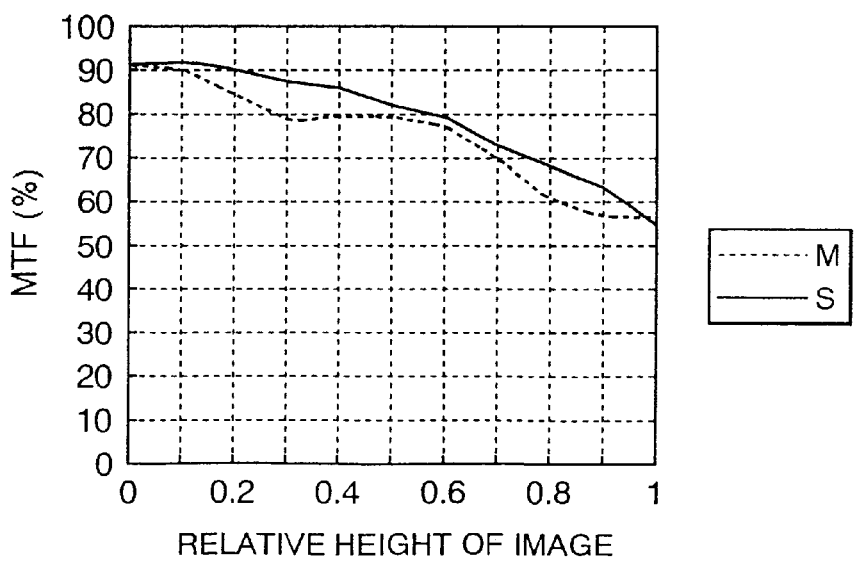
FIG. 25 shows a MTF characteristic curve for indicating focus quality of the projection lens device of the embodiment according to the present invention shown in Table 2.
Figure 26:
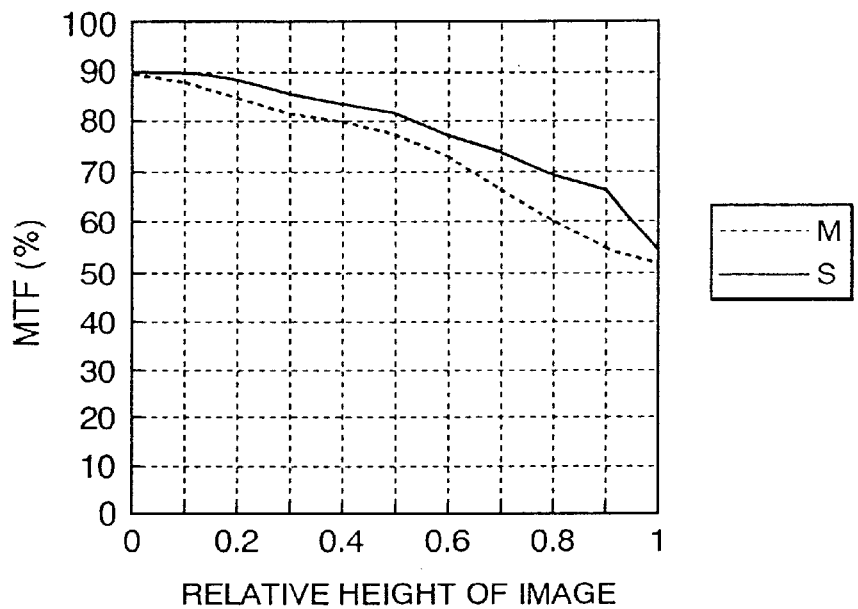
FIG. 26 shows a MTF characteristic curve for indicating focus quality of the projection lens device of the embodiment according to the present invention shown in Table 3.
Figure 27:
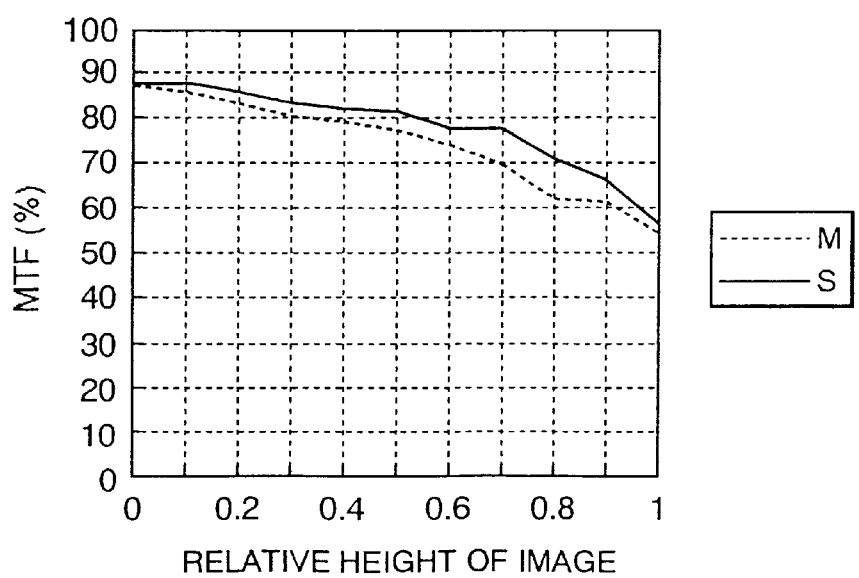
FIG. 27 shows a MTF characteristic curve for indicating focus quality of the projection lens device of the embodiment according to the present invention shown in Table 4.
Figure 28:
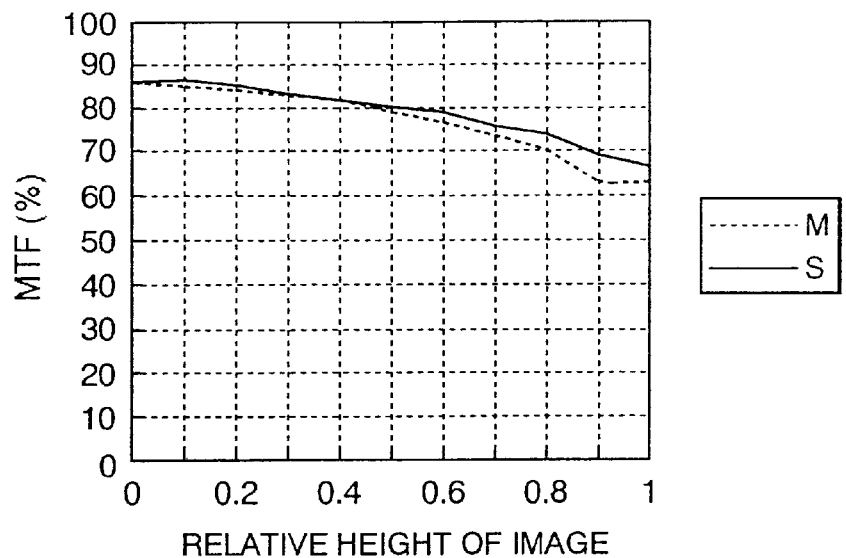
FIG. 28 shows a MTF characteristic curve for indicating focus quality of the projection lens device of the embodiment according to the present invention shown in Table 5.
Figure 29:
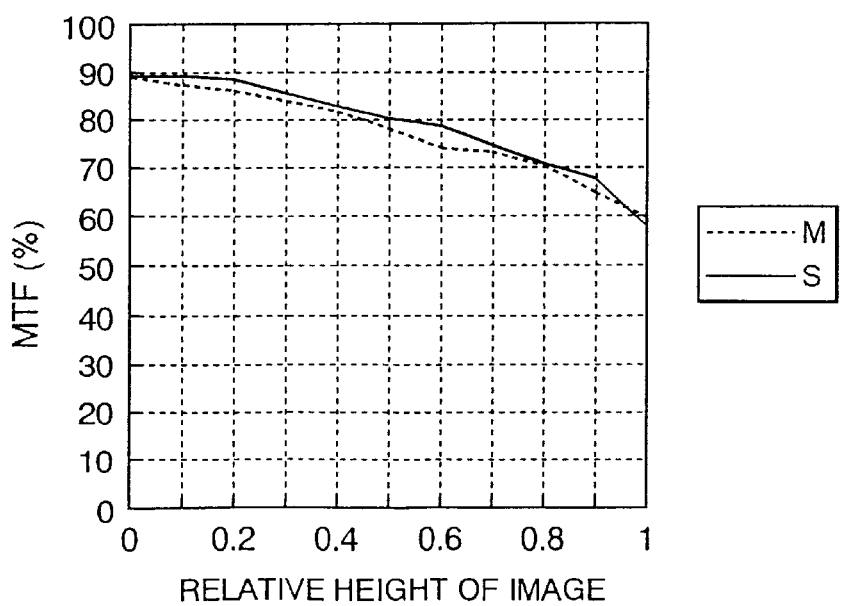
FIG. 29 shows a MTF characteristic curve for indicating focus quality of the projection lens device of the embodiment according to the present invention shown in Table 6.
Figure 30:
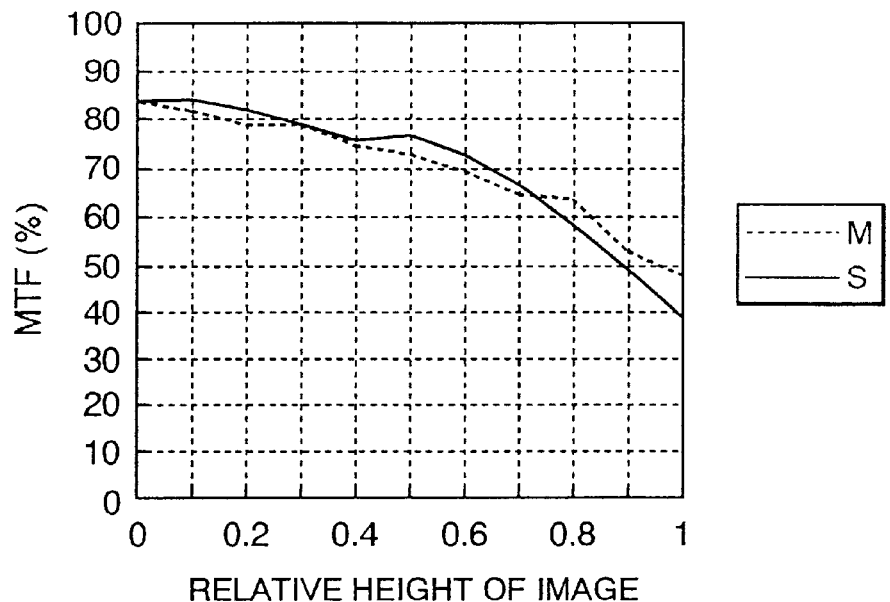
FIG. 30 shows a MTF characteristic curve for indicating focus quality of the projection lens device of the embodiment according to the present invention shown in Table 7.
Figure 33:
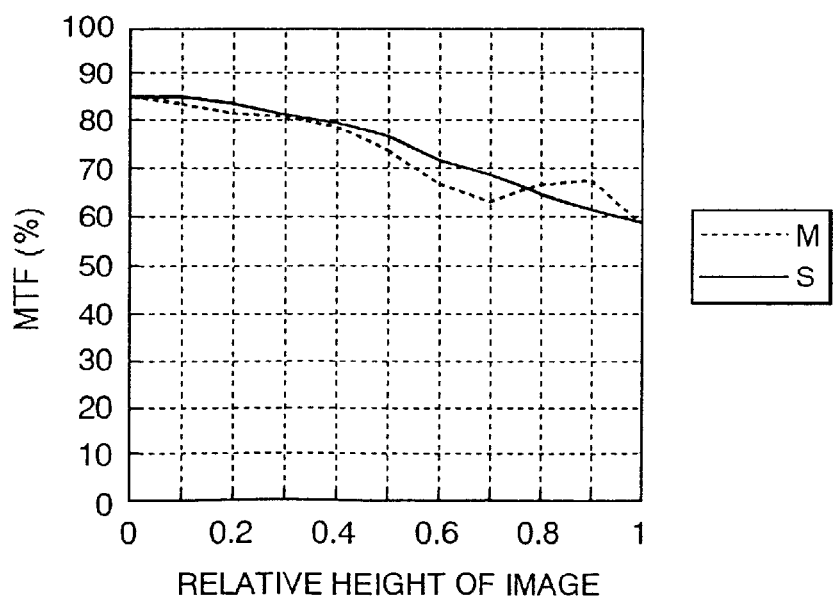
FIG. 33 shows a MTF characteristic curve for indicating focus quality of the projection lens device of the embodiment according to the present invention shown in Table 10.

Here, FIG. 24 shows a characteristic curve corresponding to the Table 1, FIG. 25 corresponding to the Table 2, and hereinafter in the same manner in the above, and then FIG. 33 corresponding to the Table 10, wherein a broken line M represents a meridional MTF and a solid line S a sagittal MTF. However, for evaluation, the frequency corresponding to a stripe pattern signal is adopted, which is used for displaying a pattern of white and black stripes at the 300 pieces on a resolution test pattern for TV. Further, the wavelength and weight of the light ray used for the evaluation are, for instance, 100 (weight) for 545 (nm) (wavelenth), 10 for 450 (nm), and 51 for 650 (nm).

From FIGS. 24 to 33, it is apparent that a preferable focus quality can be obtained.

Figure 31:
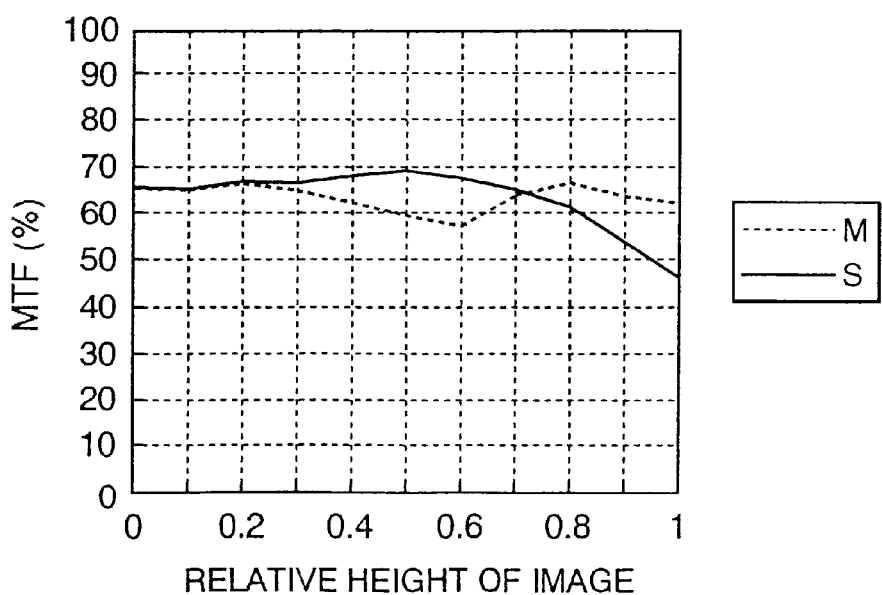
FIG. 31 shows a MTF characteristic curve for indicating focus quality of the projection lens device of the embodiment according to the present invention. shown in Table 8.
Figure 32:
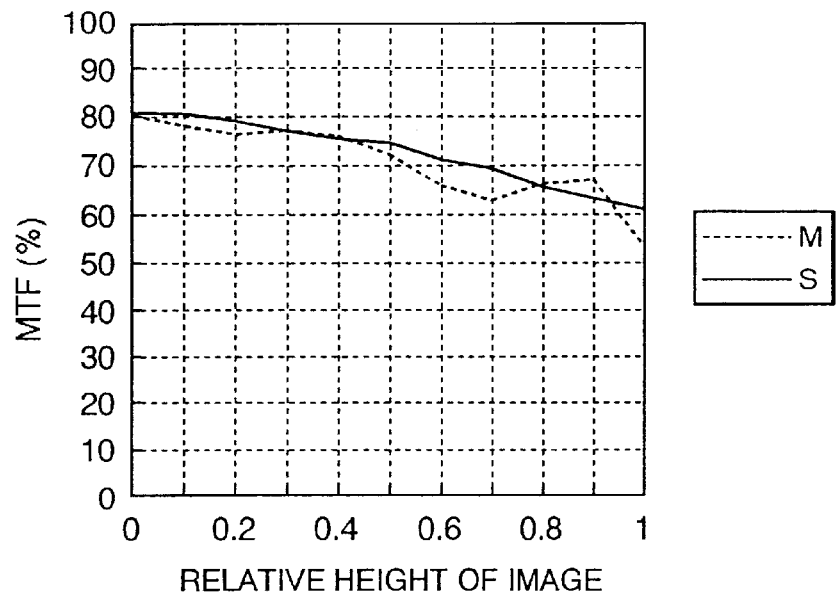
FIG. 32 shows a MTF characteristic curve for indicating focus quality of the projection lens device of the embodiment according to the present invention shown in Table 9.

Further, for an ultra-wide projection lens device of the embodiment No. 8, which has the field angle of 95 degree and is bright for the F number of 1.38, the focus quality lies within a range sufficient for practical use, as is shown in FIG. 31. Also, a result of evaluation of deformation, in case where the image displayed on the single-plate liquid crystal panel of 1.6 inches is projected upon a screen of 50 inches by using the projection lens device according to the present invention mentioned in the above, is evaluated by the distortion rate (%), by referring to FIGS. 34 to 43.

Figure 34:
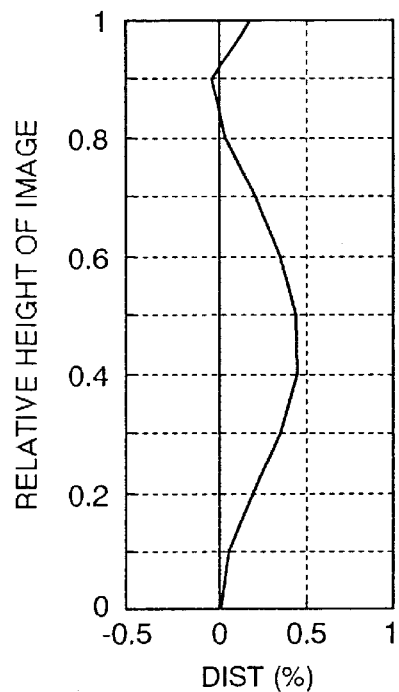
FIG. 34 shows a distortion characteristic curve in the projection lens device of the embodiment according to the present invention shown in Table 1.
Figure 35:
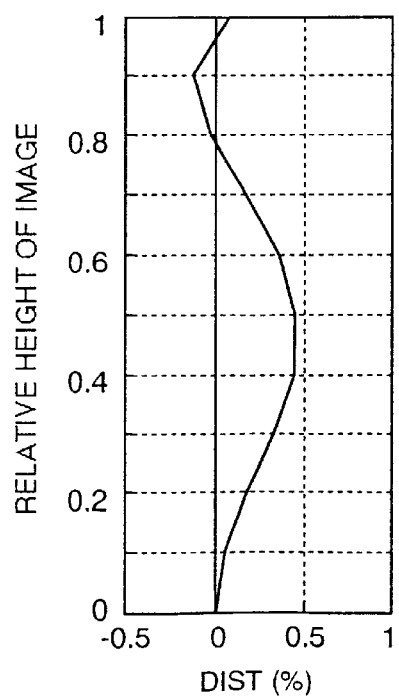
FIG. 35 shows a distortion characteristic curve in the projection lens device of the embodiment according to the present invention shown in Table 2.
Figure 36:
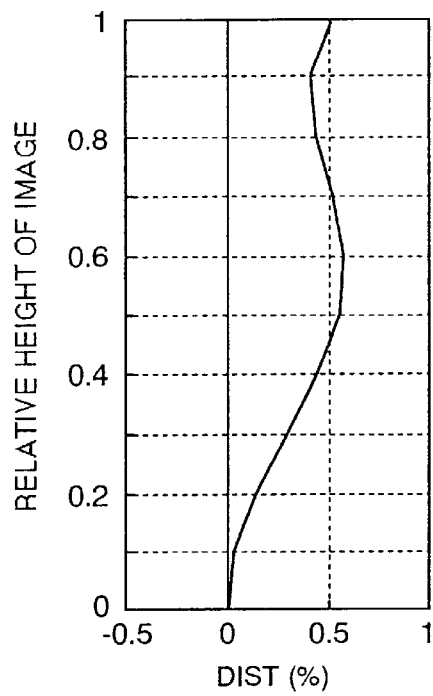
FIG. 36 shows a distortion characteristic curve in the projection lens device of the embodiment according to the present invention shown in Table 3.
Figure 37:
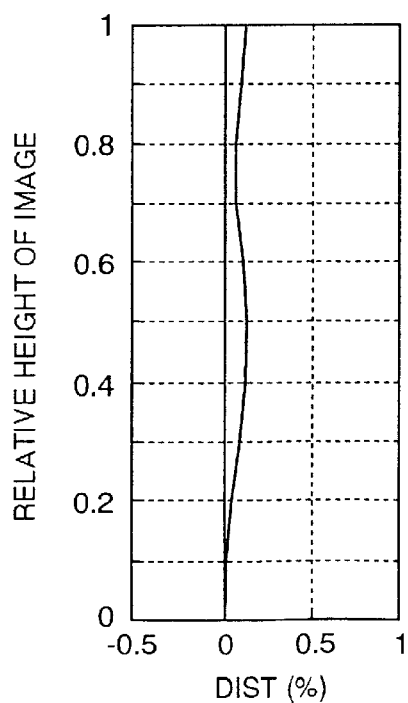
FIG. 37 shows a distortion characteristic curve in the projection lens device of the embodiment according to the present invention shown in Table 4.
Figure 38:
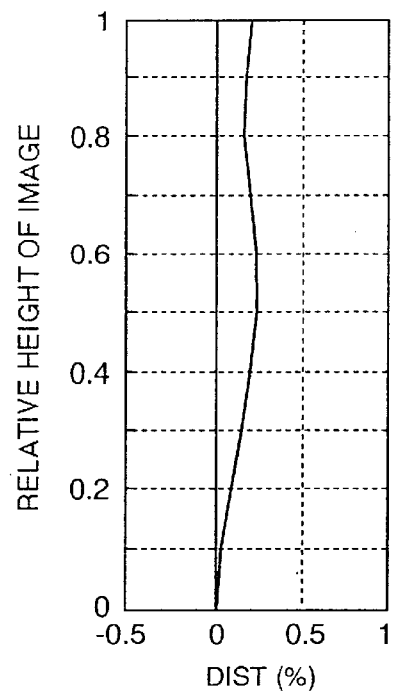
FIG. 38 shows a distortion characteristic curve in the projection lens device of the embodiment according to the present invention shown in Table 5.
Figure 39:
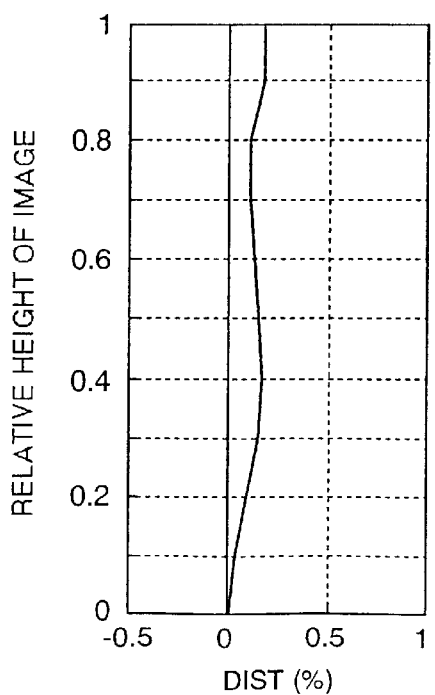
FIG. 39 shows a distortion characteristic curve in the projection lens device of the embodiment according to the present invention shown in Table 6.
Figure 40:
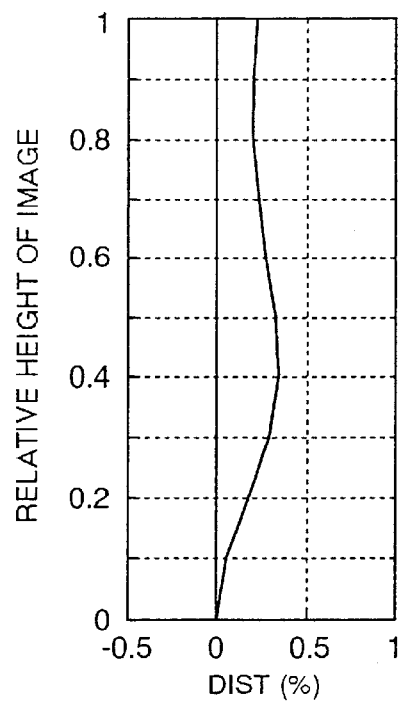
FIG. 40 shows a distortion characteristic curve in the projection lens device of the embodiment according to the present invention shown in Table 7.
Figure 41:
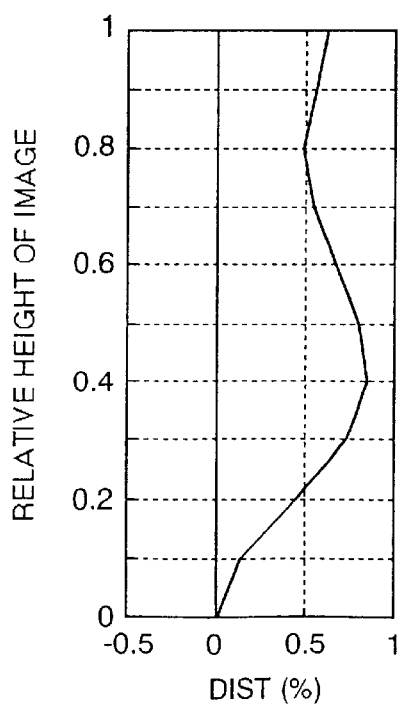
FIG. 41 shows a distortion characteristic curve in the projection lens device of the embodiment according to the present invention shown in Table 8.
Figure 42:
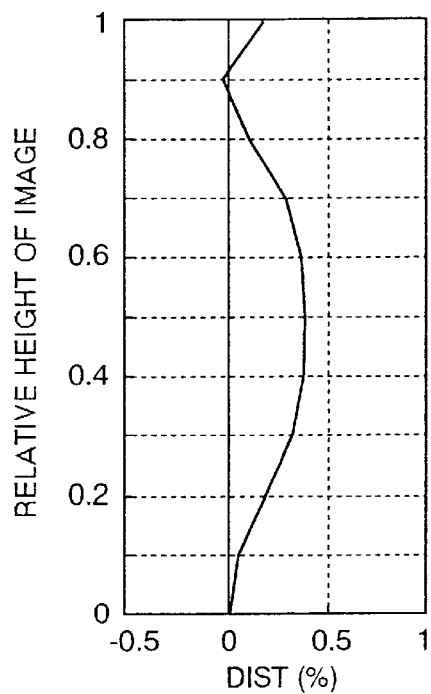
FIG. 42 shows a distortion characteristic curve in the projection lens device of the embodiment according to the present invention shown in Table 9.
Figure 43:
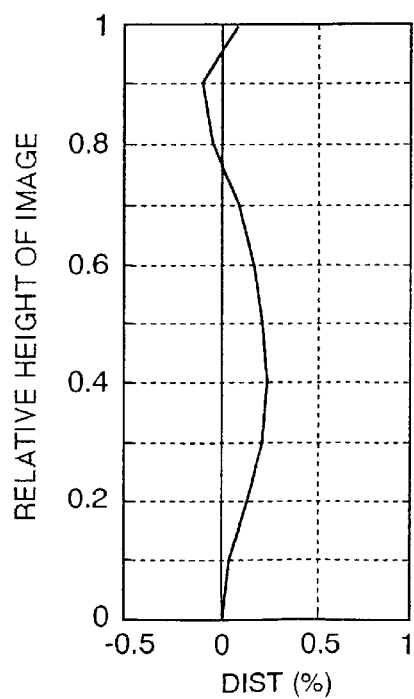
FIG. 43 shows a distortion characteristic curve in the projection lens device of the embodiment according to the present invention shown in Table 10.

Here, FIG. 34 shows a characteristic curve corresponding to the Table 1, FIG. 35 corresponding to the Table 2, hereinafter in the same manner in the above, and then FIG. 43 corresponding to the Table 10. In spite of such the ultra-wide field angle being close to 90 degree in the field angle, the distortion rate is within a range from 0.5% to 0.8% (at the field angle of 95 degree), therefore shows a level of no problem in the practical use.

Further, the F number for indicating the brightness of the projection lens device according to the present invention lies from 1.35 to 1.41, therefore it is very small comparing to that, i.e., from 2.4 to 4.5, of the ultra-wide projection lens device exceeding 90 degree in the field angle, according to the conventional art, thereby ensuring sufficient brightness.

Figure 44:
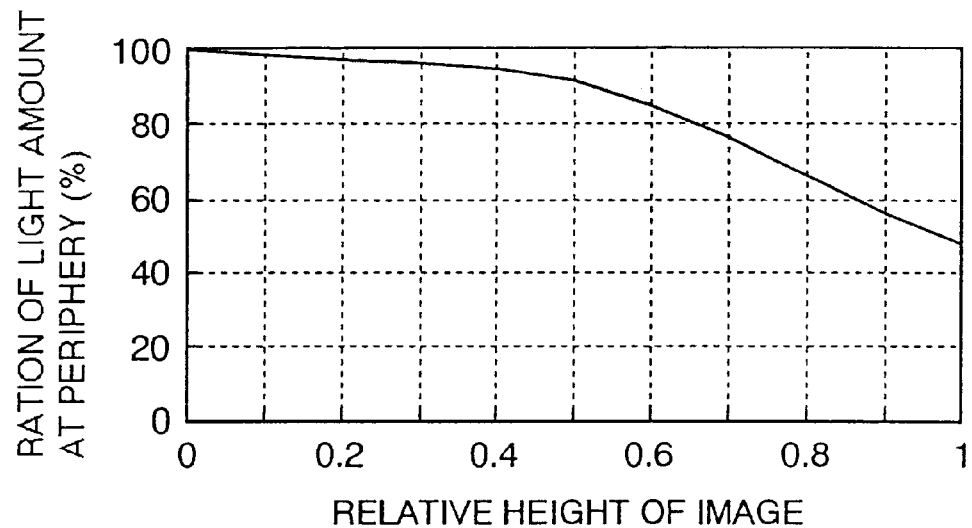
FIG. 44 shows a light an amount ratio at periphery in the projection lens device of the embodiment according to the present invention shown in Table 1.
Figure 45:
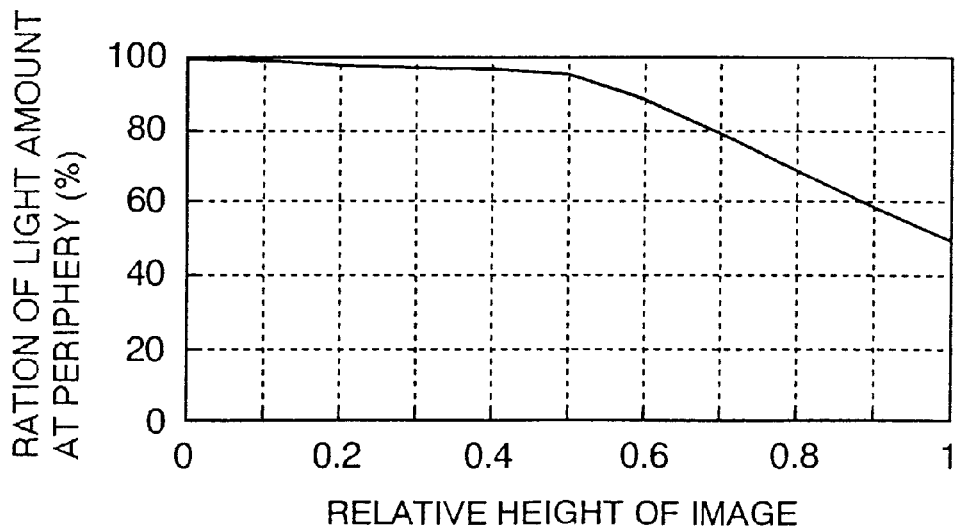
FIG. 45 shows a light amount ratio at periphery in the projection lens device of the embodiment according to the present invention shown in Table 2.
Figure 46:
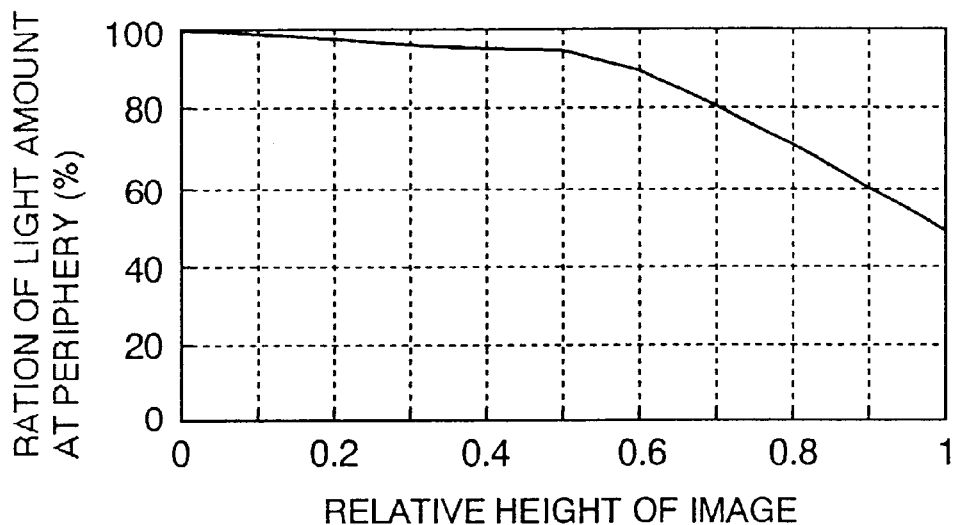
FIG. 46 shows a light amount ratio at periphery in the projection lens device of the embodiment according to the present invention shown in Table 3.
Figure 47:
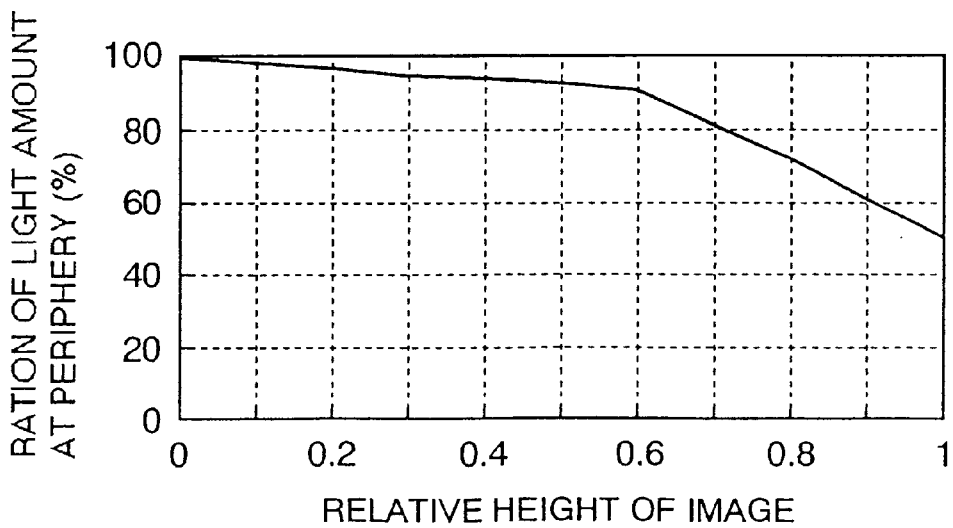
FIG. 47 shows a light amount ratio at periphery in the projection lens device of the embodiment according to the present invention shown in Table 4.
Figure 48:
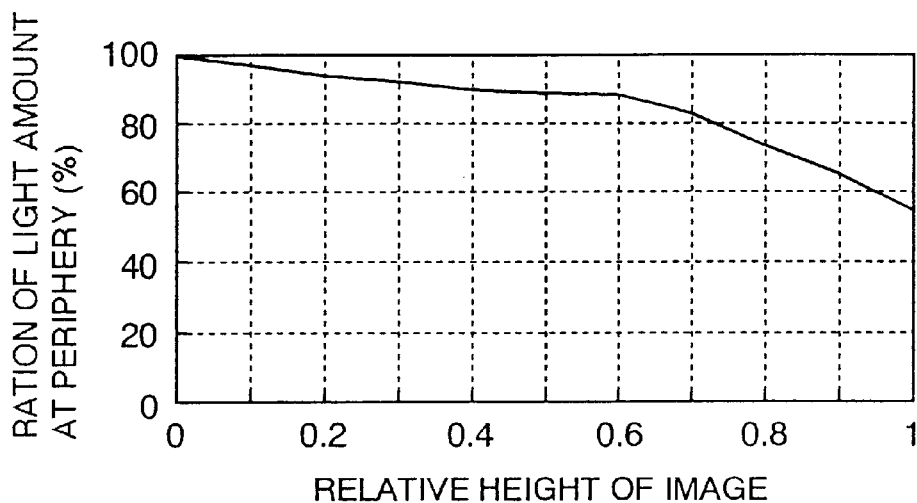
FIG. 48 shows a light amount ratio at periphery in the projection lens device of the embodiment according to the present invention shown in Table 5.
Figure 49:
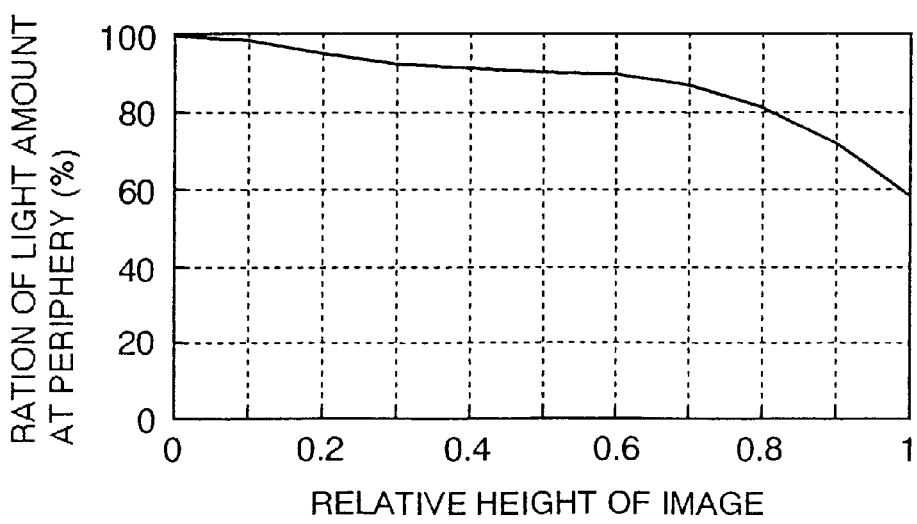
FIG. 49 shows a light amount ratio at periphery in the projection lens device of the embodiment according to the present invention shown in Table 6.
Figure 50:
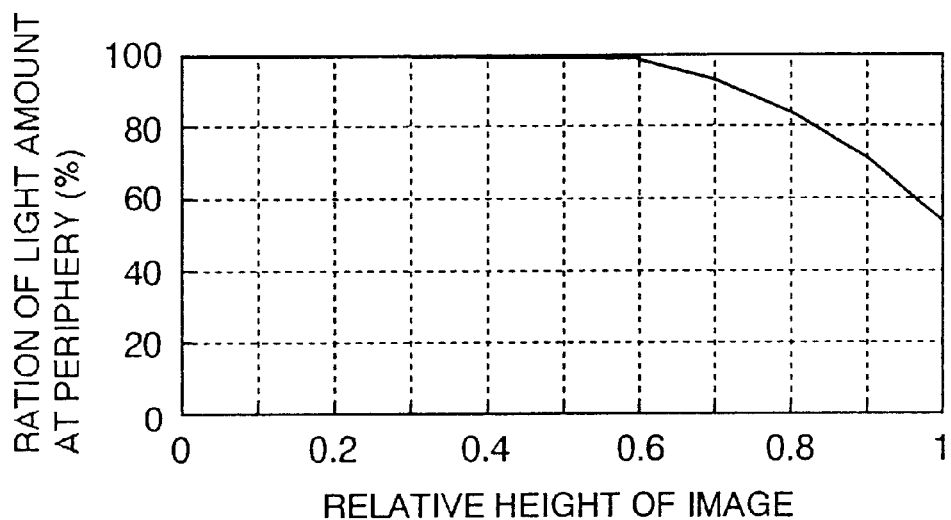
FIG. 50 shows a light amount ratio at periphery in the projection lens device of the embodiment according to the present invention shown in Table 7.
Figure 51:
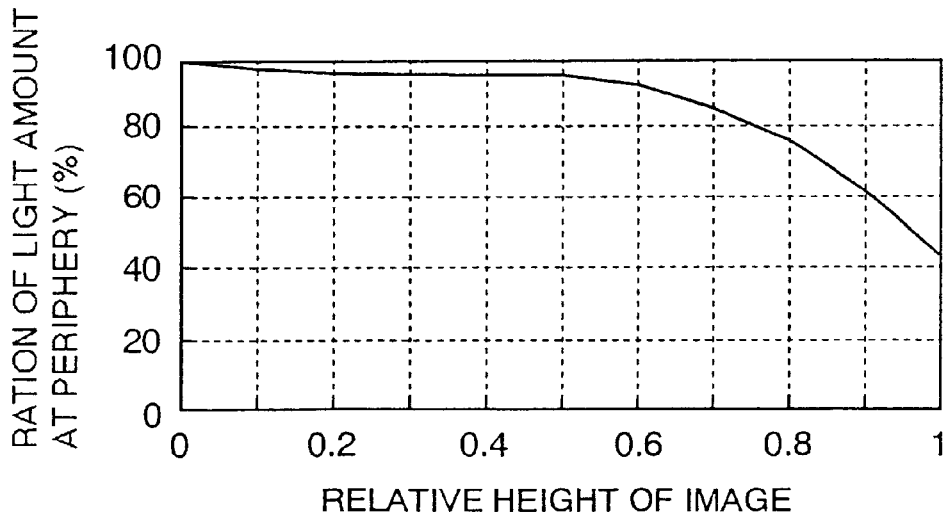
FIG. 51 shows a light amount ratio at periphery in the projection lens device of the embodiment according to the present invention shown in Table 8.
Figure 52:
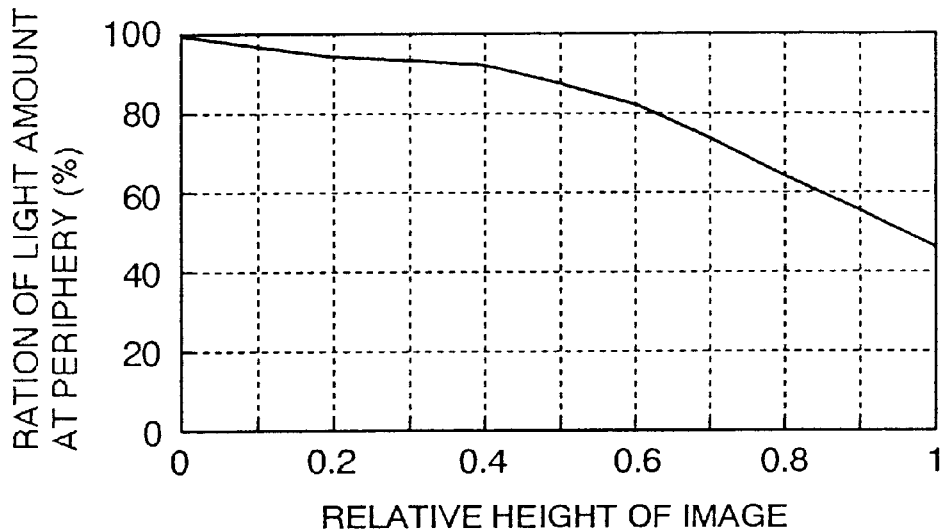
FIG. 52 shows a light amount ratio at periphery in the projection lens device of the embodiment according to the present invention shown in Table 9.
Figure 53:
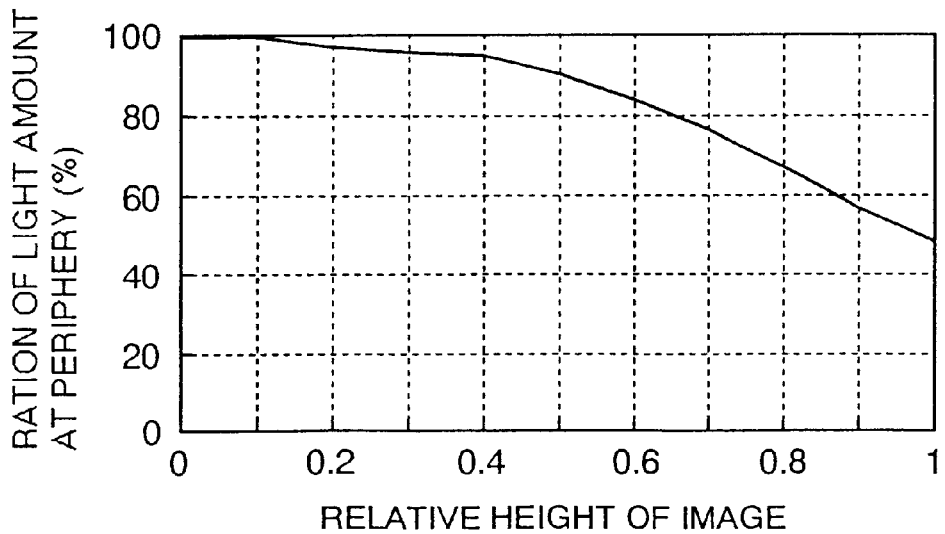
FIG. 53 shows a light amount ratio at periphery in the projection lens device of the embodiment according to the present invention shown in Table 10.

Furthermore, the brightness of an entire surface of the screen is evaluated and the result of it is shown in FIGS. 44 to 53. Here, FIG. 44 shows a characteristic curve corresponding to the Table 1, FIG. 45 corresponding to the Table 2, hereinafter in the same manner in the above, and then FIG. 53 corresponding to the Table 10. In spite of such the ultra-wide field angle being close to 90 degree in the field angle, the brightness more than 45% can be obtained at the most peripheral portion (100% corner) by constructing the telecentric system, in which the principle ray of the light flux incident from the respective positions of the liquid crystal panel comes almost in parallel to the optical axis of the projection lens device, therefore showing to a level of no problem in the practical use.

In the embodiments shown from the Table 1 to the Table 10 according to the present invention, assuming that the refractive power of the entire system of the projection lens system (i.e., a reversed number of the focus distance) is $P_0$, the refractive power of the first lens group $G_1$ is $P_{G1}$, the refractive power of the second lens group $G_2$ is $P_{G2}$, and the refractive power of the third lens group $G_3$ is $P_{G3}$, such the relationship is established as shown in the Table 11. Namely, $-0.3 < P_{G1}/P_0 < -0.15$ $0.3 < P_{G1}/P_0 < 0.5$ $-1.0 < P_{G3}/P_0 < -0.8$.

In the embodiments of the present invention, as previously mentioned, the all positive refractive power of the entire system of the projection lens device is concentrated into the second lens group, and the lens groups of the negative refractive powers are positioned at the side of the screen as well as the side of the liquid crystal panel.

Next, with the four pieces of the lens elements constructing the first lens group $G_1$, one of the first lens element $L_1$, the second lens element $L_2$, and the third lens element $L_3$ are the negative meniscus lenses, each of which has the convex surface toward the side of the screen, thereby compensating the curvature of image field while suppressing the generation of aberration.

Further, in the projection lens device according to the present invention, an adjustment in the focus, in case of changing the magnitude of the image projected upon the screen by shifting a distance of projection, can be realized by changing the distance between the second lens group $G_2$ and the third lens group $G_3$. At this moment, the changes in the distortion of the image field and the magnitude chromatic aberration can absorbed by shifting the fourth lens element $L_4$ along with the optical axis.

In the embodiments shown from the Table 1 to the Table 10 according to the present invention, assuming that the refractive power of the first lens group $G_1$ is $P_{G1}$, the refractive power of the first lens element is $P_1$, the refractive power of the second lens element is $P_2$, the refractive power of the third lens element is $P_3$, and the refractive power of the fourth lens element is $P_4$, then such the relationship is established as shown in the Table 12. Namely, $0.0 < P_1/P_{G1} < 0.1$ $0.25 < P_2/P_{G1} < 0.45$ $0.10 < P_3/P_{G1} < 0.30$ $0.15 < P_4/P_{G1} < 0.30$ Next, among the three (3) pieces of the aspherical plastic lenses in the projection lens device shown as the embodiments of the present invention, the first lens element $L_1$ is designed as small as possible in the refractive power of the lens, and further uniform in the thickness of the lens shape, thereby releasing the fluctuation in the refractive power due to the changes in the shape and in the refractive index, which inherently accompanies the change in the temperature and the humidity for the plastic lenses.

Further, the tenth lens element $L_{10}$ and the eleventh lens element $L_{11}$ are so designed that they are almost equal to each other in the absolute value of the refractive power of the lens, thereby canceling the fluctuation in the refractive power due to the changes in the shape and in the refractive index accompanying the change in the temperature and the humidity, which are caused in the respective lens elements.

In the embodiments shown from the Table 1 to the Table 10 according to the present invention, assuming that the refractive power of the entire system of the projection lens system is $P_0$, the refractive power of the first lens element is the refractive power of the tenth lens element is $P_{10}$, and the refractive power of the eleventh lens element is $P_{11}$, then such the relationship is established as shown in the Table 13. Namely, $0.0 > P_1/P_0 > -0.1$ $0.27 < P_{10}/P_0 < -0.32$ $0.0 > P_{11}/P_0 > -0.25$.

Further, with the projection lens device according to the present invention, in the embodiments shown from the Table 1 to the Table 10 according to the present invention, in particular, with the refractive power of each lens element constructing the second lens group $G_2$ which carries All the positive refractive power of the entire system, assuming that the refractive power of the entire system of the second lens group is $PG_2$, the refractive power of the fifth lens element is $P_5$, the refractive power of the sixth lens element is $P_6$, the refractive power of the seventh lens element is $P_7$ the refractive power of the eighth lens element is $P_8$, and the refractive power of the ninth lens element is $P_9$, then such the relationship is established as shown in the Table 11. Namely, $0.9 < P_5/P_{G2} < 1.5$ $0.7 < P_6/P_{G2} < 1.0$ $-0.65 < P_7/P_{G2} < -0.45$ $0.70 < P_8/P_{G2} < 1.1$ $0.60 < P_9/P_{G2} < 0.85$ The seventh lens element is a double-concave lens which is made of high dispersion material, and is laminated or cemented with the eighth lens element of the double-convex lens so as to compensate the chromatic aberration.

In the above, the features of the projection lens according to the present invention is described on the basis of the lens data thereof. In those embodiments, the aspherical surface of using the coefficient AH of the tenth ($10^{th}$) order for representing that shape thereof is described, however, it is needless to say that the structure including the coefficient in the order of the twelfth ($12^{th}$) or higher than that is also included within the scope of the present invention.

TABLE 14

| Lens No. | $P_{G1}/P_0$ | $P_{G2}/P_0$ | $P_{G1}/P_0$ | Focus Distance of Total System fo (mm) |
| --- | --- | --- | --- | --- |
| 1 | −0.2254 | 0.3887 | −0.8694 | 21.890 |
| 2 | −0.2254 | 0.3945 | −0.8616 | 21.891 |
| 3 | −0.2254 | 0.4254 | −0.8511 | 21.987 |
| 4 | −0.2251 | 0.4423 | −0.8841 | 21.866 |
| 5 | −0.2249 | 0.4729 | −0.9133 | 21.847 |
| 6 | −0.2243 | 0.4529 | −0.9416 | 21.789 |
| 7 | −0.2251 | 0.4392 | −0.8767 | 21.861 |
| 8 | −0.2036 | 0.3724 | −0.8824 | 19.779 |
| 9 | −0.2322 | 0.4106 | −0.8748 | 21.874 |
| 10 | −0.1893 | 0.4073 | −0.8973 | 21.854 |
| 11 | −0.1580 | 0.3481 | −0.9090 | 21.833 |
| 12 | −0.1560 | 0.3235 | −0.9280 | 21.833 |
| 13 | −0.1560 | 0.3438 | −0.8900 | 21.850 |

TABLE 15

| Lens No. | $P_1/P_{G1}$ | $P_2/P_{G1}$ | $P_3/P_{G1}$ | $P_4/P_{G1}$ | Focus Distance of Total System fo (mm) |
|---|---|---|---|---|---|
| 1 | 0.0742 | 0.3127 | 0.2478 | 0.1857 | −25.178 |
| 2 | 0.0646 | 0.3173 | 0.2491 | 0.1932 | −25.406 |
| 3 | 0.0439 | 0.3227 | 0.2570 | 0.2101 | −25.834 |
| 4 | 0.0064 | 0.3982 | 0.1904 | 0.2272 | −24.732 |
| 5 | 0.0549 | 0.2964 | 0.1777 | 0.2556 | −23.922 |
| 6 | 0.0531 | 0.2819 | 0.1737 | 0.2658 | −23.140 |
| 7 | 0.0572 | 0.3156 | 0.1647 | 0.2698 | −24.935 |
| 8 | 0.0851 | 0.2891 | 0.1339 | 0.2240 | −22.414 |
| 9 | 0.0804 | 0.2815 | 0.2733 | 0.1844 | −25.005 |
| 10 | 0.0732 | 0.2936 | 0.2723 | 0.1796 | −24.356 |
| 11 | 0.1077 | 0.3091 | 0.2476 | 0.1721 | −24.019 |
| 12 | 0.1268 | 0.3029 | 0.2426 | 0.1545 | −23.537 |
| 13 | 0.1292 | 0.3163 | 0.2520 | 0.1487 | −24.551 |

TABLE 16

| Lens No. | $P_1/P_0$ | $P_{10}/P_0$ | $P_{11}/P_0$ | Focus Distance of Total System fo (mm) |
|---|---|---|---|---|
| 1 | −0.0645 | 0.3170 | −0.2254 | 21.890 |
| 2 | −0.0557 | 0.3170 | −0.2254 | 21.891 |
| 3 | −0.0374 | 0.3184 | −0.2264 | 21.987 |
| 4 | −0.0057 | 0.3166 | −0.2251 | 21.866 |
| 5 | −0.0501 | 0.3164 | −0.2249 | 21.847 |
| 6 | −0.0500 | 0.3155 | −0.2243 | 21.789 |
| 7 | −0.0502 | 0.3166 | −0.2251 | 21.861 |
| 8 | −0.0751 | 0.2717 | −0.2036 | 19.779 |
| 9 | −0.0703 | 0.3168 | −0.2322 | 21.874 |
| 10 | −0.0657 | 0.2964 | −0.1893 | 21.854 |
| 11 | −0.0979 | 0.2890 | −0.1580 | 21.833 |
| 12 | −0.1177 | 0.2964 | −0.1560 | 21.832 |
| 13 | −0.1150 | 0.3064 | −0.1561 | 21.850 |

TABLE 17

| Lens No. | $P_5/P_{G2}$ | $P_6/P_{G2}$ | $P_{78}/P_{G2}$ | $P_9/P_{G2}$ | $P_{10}/P_{G2}$ | Focus Distance of 2nd Lens Group f2 (mm) |
|---|---|---|---|---|---|---|
| 1 | 1.1648 | 0.9841 | −0.5455 | 1.0062 | 0.8155 | 56.313 |
| 2 | 1.1484 | 0.9511 | −0.5401 | 1.0092 | 0.8036 | 55.496 |
| 3 | 1.0834 | 0.8344 | −0.5468 | 0.9443 | 0.7484 | 51.684 |
| 4 | 1.0362 | 0.8736 | −0.5410 | 0.8851 | 0.7159 | 49.434 |
| 5 | 0.9649 | 0.8565 | −0.5155 | 0.7814 | 0.6690 | 46.197 |
| 6 | 1.0301 | 0.9170 | −0.4887 | 0.7595 | 0.6967 | 48.108 |
| 7 | 1.0658 | 0.8664 | −0.4846 | 0.8311 | 0.7208 | 49.775 |
| 8 | 1.3679 | 0.7577 | −0.6360 | 0.9146 | 0.7297 | 53.114 |
| 9 | 1.1059 | 0.9309 | −0.5998 | 0.9776 | 0.7714 | 53.270 |
| 10 | 1.1196 | 0.9376 | −0.5723 | 0.9660 | 0.7279 | 53.653 |
| 11 | 1.3540 | 1.1013 | −0.5715 | 1.1157 | 0.8303 | 62.725 |
| 12 | 1.4569 | 1.2476 | −0.6150 | 1.1627 | 0.9162 | 67.490 |
| 13 | 1.3725 | 1.1424 | −0.5800 | 1.1163 | 0.8910 | 63.559 |

As is fully described in the above, in accordance with the present invention, (1) with a projection lens device for projecting the original image being displayed on an image source upon a screen, comprising in sequence from the screen: a first lens group having a negative refractive power as an entire system thereof; a second lens group having a positive refractive power as an entire system thereof; and a third lens group having a negative refractive power as an entire system thereof, it is possible to obtain a flat image (picture) field even with a wide field angel of around 90 degree, and thereby suppressing the distortion less than 1%.

Further, in accordance with the present invention, (2) since the negative first lens group and the third lens group are positioned at both sides of the positive second lens group in symmetric between them, it is possible to reduce the distortion less than 1% even with such the wide field angel of around 90 degree.

In accordance with the present invention, (3) the third lens group is so formed that it has a negative refractive power in the vicinity of the optical axis thereof and a positive refractive power at a periphery thereof, thereby enabling to minimize the diameter of the lens elements of the second lens group.

In accordance with the present invention, (4) the projection lens device is constructed with the telecentric system, therefore, it is possible to ensure a sufficient light amount at the periphery even with the wide field angel of around 90 degree.

In accordance with the present invention, (5) if the plastic aspherical lens is used in the projection lens device, it is possible to release the fluctuation of the focus quality due to change in shape and refractive index, which accompanies with change in temperature and humidity, by forming the lens as uniform as possible in the thickness thereof, or by constructing such that the fluctuation in the refractive power due to change of the temperature and humidity is canceled by combining a plurality of the plastic aspherical lenses.

In accordance with the present invention, (6) between the lens and the liquid crystal panel is optically connected with a medium (i.e., the cooling liquid) of refractive index being greater than 1.0, thereby reducing the loss due to the reflection of the image light as well as releasing the decrease in contrast.

In accordance with the present invention, (7) it is constructed so that between the lens and the liquid crystal panel is filled with the liquid for cooling the liquid crystal panel and the polarization panel, therefore, it is possible to reduce the increase in temperature of the liquid crystal panel and the polarization panel.

Further, the liquid crystal panel and the polarizing plate have tendency to decrease the polarization characteristics thereof with increase of the temperature (for instance, at 70° C.), in particular, the degree of polarization, i.e., a ratio in amount of polarized component with respect to the total light. As a result of this, it causes the decreasing of the contrast characteristic of the display apparatus. Therefore, according to the present invention, both of those, i.e., the liquid crystal panel and the polarizing plate are cooled by means of a cooling liquid in order to obtain an image of high contrast. In particular, by using such the means of the cooling liquid, comparing to the compulsive cooling device of using air, the temperature of those liquid crystal panel and polarizing plate can be decreased down by 7–10° C., therefore, it brings an improvement of contrast characteristic by about 10% up. Moreover, the liquid crystal panel and the polarizing plate show decrease in the reliability thereof in the use under a high temperature (at Max. 70° C.), however, according to the use in the cooling liquid as mentioned above, they can be prevented from being decreased in the reliability while obtaining the long life time thereof. For example, the life time of the liquid crystal panel and the polarizing plate can be extended to one-and-half (1.5) or two (2) times longer by decreasing down the temperature by 10° C.

Figure 54:
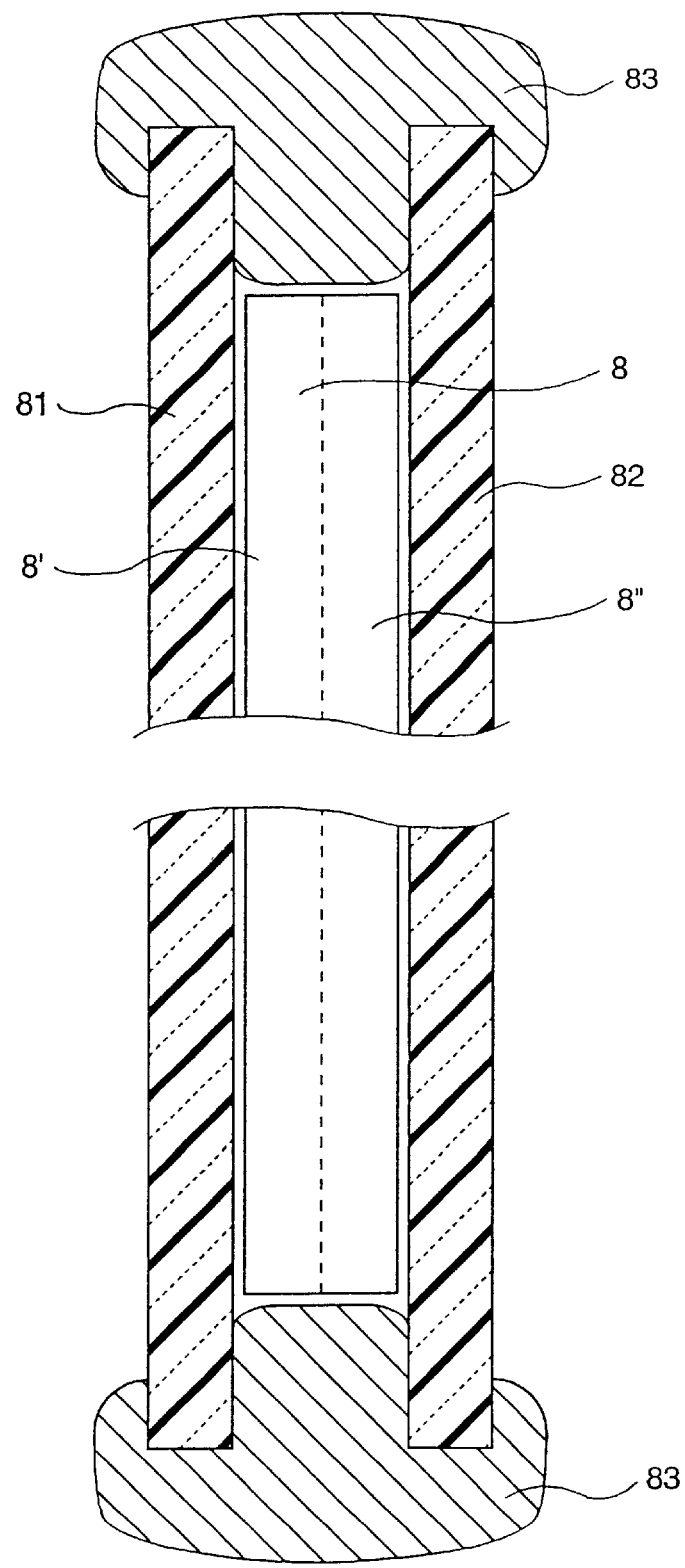
FIG. 54 shows a cross section view for showing details of the polarizing plate in the projection device mentioned above, according to the present invention.

Lastly, FIG. 54 shows a cross section view for showing details of the polarizing plate 8 (for example, that shown in FIG. 1 or 2), wherein the polarizing plate 8 is sandwiched between a pair of glass plates 81 and 82, and at all around the periphery thereof is sealed with a sealing ring 83 of material such as a silicon, or silicon adhesive, liquid-tightly. Normally, as the cooling liquid 9 is used solvent, such as ethylene glycol, diethylene glycol, glycerin or a mixture thereof, which dissolves the resin material of the polarizing plate 8. Therefore, the polarizing plate 8 is positioned between the pair of glass plates, for protecting it from being contacted with the cooling liquid of such as the solvent, i.e., not be dissolved into it. Further, not shown in Fig., not only the polarizing plate 8, but also the liquid crystal panel 7 can be sandwiched between the pair of glass plates, at the periphery of which is tightly sealed with the silicon ring, for the same purpose mentioned above.

Moreover, the polarizing plate(s) 8, which are/is positioned before and/or after the liquid crystal panel 7 as shown in FIG. 1 or FIG. 2, can be one of multiplex type, i.e., a polarizing plate 8 formed with two (2) pieces of polarizing plates 8' and 8" being piled up to each other, as shown by broken-line in FIG. 54. Namely, it is found that, according to the inventors, by using the polarizing plate of such the multi-type, it is possible to obtain an image of higher contrast, though being reduced down a little bit in the brightness thereof. Namely, according to the experiments made by the inventors, with use of such the multi-polarizing plate of piling up the two (2) pieces of the polarizing plates (the polarizing plate: SHC13UHCAR, Polatechno Co., Ltd., Japan), the degree of polarization raises up, thereby the contrast ratio of the image can be increased up by 30%, but the decrease in the brightness is about 15% more or less. Furthermore, by piling up two pieces of polarizing plates, a higher reliability (i.e., a longer life time) of the polarizing plate can be achieved, since a margin up to a desired degree of polarization (a min. value thereof) can be obtained with sufficiency.

Further, applying the projection lens device mentioned in the above, it is possible to realize a rear type projection display device, which is able to obtain a high focus image, as well as is compact in size thereof.

What is claimed is:

1. A projection display apparatus comprising:
    an optical modulator for modulating an incident light from a light source; and
    a projection lens device for projecting the light modulated by said optical modulator, wherein said optical modulator includes:
    a liquid crystal panel;
    a cooling liquid filled up at least within a space defined between said liquid crystal panel and a lens of said projection lens device which is located closest to a light source side; and
    a polarizing plate positioned in said space so that opposite surfaces of said polarizing plate contact said cooling liquid.

2. A projection display apparatus as claimed in claim 1, wherein a protection plate is further provided at the light source side of said liquid crystal panel.

3. A projection display apparatus as claimed in claim 2, wherein said protection plate comprises a second polarizing plate.

4. A projection display apparatus as claimed in claim 3, wherein said polarizing plate is attached on a surface of said protection plate at the screen side thereof.

5. A projection display apparatus as claimed in claim 3, wherein an anti-reflection coating is treated on a surface of said protection plate at the light source side thereof.

6. A projection display apparatus as defined in claim 1, wherein at least one of said liquid crystal panel and said polarizing plate is covered with a material which protects said liquid crystal plate or said polarizing plate from being contacted with said cooling liquid, directly.

7. A projection display apparatus as claimed in claim 1, wherein said polarizing plate is sandwiched between a pair of protection plates.

8. A projection display apparatus as claimed in claim 7, wherein said protection plates are made of glass material.

9. A projection display apparatus comprising:
    an optical modulator for modulating an incident light from a light source; and
    a projection lens device for projecting the light modulated by said optical modulator, wherein said optical modulator includes:
    a liquid crystal panel;
    a cooling liquid filled up at least within a space defined between said liquid crystal panel and a lens of said projection lens device which is located closest to a light source side; and
    a polarizing plate positioned in said space so that opposite surfaces of said polarizing plate contact said cooling liquid;
    wherein a protection plate is further provided at the light source side of said liquid crystal panel; and
    wherein said cooling liquid is further filled within a space defined between said liquid crystal panel and said protection plate.

10. A projection display apparatus comprising:
    an optical modulator for modulating an incident light from a light source; and
    a projection lens device for projecting the light modulated by said optical modulator, wherein said optical modulator includes:
    a liquid crystal panel;
    a cooling liquid filled up at least within a space defined between said liquid crystal panel and a lens of said projection lens device which is located closest to a light source side; and
    a polarizing plate formed of a plurality of polarizing members, positioned either before or after said liquid crystal panel, so that opposite surfaces of said polarizing plate contact said cooling liquid.

11. A projection display apparatus comprising:
    an optical modulator for modulating an incident light from a light source; and
    a projection lens device for projecting the light modulated by said optical modulator, wherein said optical modulator includes:
    a liquid crystal panel;
    a cooling liquid filled up at least within a space defined between said liquid crystal panel and a lens of said projection lens device which is located closest to a light source side; and
    a polarizing plate formed of at least two polarizing members, one of the polarizing members of said polarizing plate being positioned before said liquid crystal panel and another of the polarizing members of said polarizing plate being positioned after of said liquid crystal panel so that opposite surfaces of said polarizing plate contact said cooling liquid.

\* \* \* \* \*